(12) United States Patent
Yang

(10) Patent No.: US 11,668,911 B2
(45) Date of Patent: Jun. 6, 2023

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventor: Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/580,512

(22) Filed: Jan. 20, 2022

(65) Prior Publication Data

US 2022/0150390 A1    May 12, 2022

Related U.S. Application Data

(63) Continuation of application No. 16/848,669, filed on Apr. 14, 2020, now Pat. No. 11,262,552, which is a continuation of application No. 16/434,023, filed on Jun. 6, 2019, now Pat. No. 10,656,393, which is a continuation of application No. 15/782,614, filed on Oct. 12, 2017, now Pat. No. 10,365,460.

(30) Foreign Application Priority Data

Jun. 16, 2017   (TW) .................. 106120258

(51) Int. Cl.
*G02B 13/00* (2006.01)
*G02B 13/18* (2006.01)
*G02B 9/64* (2006.01)
*H04N 5/225* (2006.01)
*G02B 27/00* (2006.01)

(52) U.S. Cl.
CPC .......... *G02B 13/0045* (2013.01); *G02B 9/64* (2013.01); *G02B 13/18* (2013.01); *G02B 27/0025* (2013.01); *H04N 5/2254* (2013.01)

(58) Field of Classification Search
CPC combination set(s) only.
See application file for complete search history.

(56) References Cited

U.S. PATENT DOCUMENTS

| | | |
|---|---|---|
| 2016/0109687 A1 | 4/2016 | Son |
| 2017/0082834 A1 | 3/2017 | Tang |
| 2017/0082835 A1 | 3/2017 | Tang |
| 2017/0090157 A1 | 3/2017 | Tang |
| 2017/0090158 A1 | 3/2017 | Tang |
| 2017/0139185 A1 | 5/2017 | Tang |
| 2017/0184819 A1 | 6/2017 | Shi |
| 2017/0336605 A1 | 11/2017 | Lai |
| 2017/0336606 A1* | 11/2017 | Lai ..................... G02B 9/64 |

* cited by examiner

*Primary Examiner* — James C. Jones
(74) *Attorney, Agent, or Firm* — Maschoff Brennan

(57) ABSTRACT

A photographing lens assembly includes seven lens elements which are, in order from an object side to an image side: a first lens element, a second lens element, a third lens element, a fourth lens element, a fifth lens element, a sixth lens element and a seventh lens element. The second lens element has positive refractive power. The seventh lens element has an image-side surface being concave in a paraxial region thereof, and the image-side surface of the seventh lens element has at least one convex shape in an off-axis region thereof.

22 Claims, 22 Drawing Sheets

PHOTOGRAPHING LENS ASSEMBLY, IMAGE CAPTURING UNIT AND ELECTRONIC DEVICE

RELATED APPLICATIONS

This application is a continuation patent application of U.S. application Ser. No. 16/848,669, filed on Apr. 14, 2020, which is a continuation patent application of U.S. application Ser. No. 16/434,023, filed on Jun. 6, 2019, which is a continuation patent application of U.S. application Ser. No. 15/782,614, filed on Oct. 12, 2017, which claims priority to Taiwan Application 106120258, filed Jun. 16, 2017, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, the electronic device equipped with one or more optical systems has become a mainstream in the market. For various applications, the optical systems are developed with various optical characteristics for achieving higher specifications, and have been widely applied to different kinds of smart electronic devices, such as multiple camera devices, wearable devices, digital cameras, vehicle devices, image recognition systems, entertainment devices, sport devices and intelligent home assistance systems, for various requirements.

In a conventional optical system featuring wide view angle and large aperture, a high image quality is generated by arranging the shape of each lens element and selecting the material of each lens element, while such lens configuration is unfavorable for the reduction in the size of optical system, the prevention of lens molding problems, the increase in lens assembling yield rate and the reduction of sensitivity. Accordingly, the conventional optical system is already unable to meet the requirements of large aperture, sufficient field of view, compactness and high image quality for current technology trends.

SUMMARY

According to one aspect of the present disclosure, a photographing lens assembly includes seven lens elements. The seven lens elements are, in order from an object side to an image side, a first lens element, a second lens element, a third lens element, a fourth lens element, a fifth lens element, a sixth lens element and a seventh lens element. The second lens element has positive refractive power. The seventh lens element has an image-side surface being concave in a paraxial region thereof, and the image-side surface of the seventh lens element has at least one convex shape in an off-axis region thereof. When a focal length of the photographing lens assembly is f, a curvature radius of an object-side surface of the second lens element is R3, a curvature radius of an image-side surface of the second lens element is R4, a curvature radius of an object-side surface of the sixth lens element is R11, a curvature radius of an image-side surface of the sixth lens element is R12, an axial distance between an object-side surface of the first lens element and an image surface is TL, and an entrance pupil diameter of the photographing lens assembly is EPD, the following conditions are satisfied:

$|f/R11|+|f/R12|<0.95;$ $(R3+R4)/(R3-R4)<1.80;$ and $TL/EPD<2.80.$

According to another aspect of the present disclosure, an image capturing unit includes the aforementioned photographing lens assembly and an image sensor, wherein the image sensor is disposed on the image surface of the photographing lens assembly.

According to still another aspect of the present disclosure, an electronic device includes the aforementioned image capturing unit.

According to yet still another aspect of the present disclosure, a photographing lens assembly includes seven lens elements. The seven lens elements are, in order from an object side to an image side, a first lens element, a second lens element, a third lens element, a fourth lens element, a fifth lens element, a sixth lens element and a seventh lens element. The second lens element has positive refractive power. The seventh lens element has an object-side surface being convex in a paraxial region thereof and an image-side surface being concave in a paraxial region thereof. The image-side surface of the seventh lens element has at least one convex shape in an off-axis region thereof. When a focal length of the photographing lens assembly is f, a focal length of the sixth lens element is f6, a curvature radius of an object-side surface of the sixth lens element is R11, a curvature radius of an image-side surface of the sixth lens element is R12, and an axial distance between an object-side surface of the first lens element and an image surface is TL, the following conditions are satisfied:

$|f/R11|+|f/R12|<0.95;$ and $|TL/f6|<0.65.$

According to yet still another aspect of the present disclosure, a photographing lens assembly includes seven lens elements. The seven lens elements are, in order from an object side to an image side, a first lens element, a second lens element, a third lens element, a fourth lens element, a fifth lens element, a sixth lens element and a seventh lens element. The first lens element has positive refractive power. The second lens element has positive refractive power. The seventh lens element has an image-side surface being concave in a paraxial region thereof, and the image-side surface of the seventh lens element has at least one convex shape in an off-axis region thereof. When a focal length of the photographing lens assembly is f, a curvature radius of an object-side surface of the second lens element is R3, a curvature radius of an image-side surface of the second lens element is R4, a curvature radius of an object-side surface of the sixth lens element is R11, a curvature radius of an image-side surface of the sixth lens element is R12, and an entrance pupil diameter of the photographing lens assembly is EPD, the following conditions are satisfied:

$|f/R11|+|f/R12|<1.80;$ $(R3+R4)/(R3-R4)<1.80;$ and $f/EPD<2.0.$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
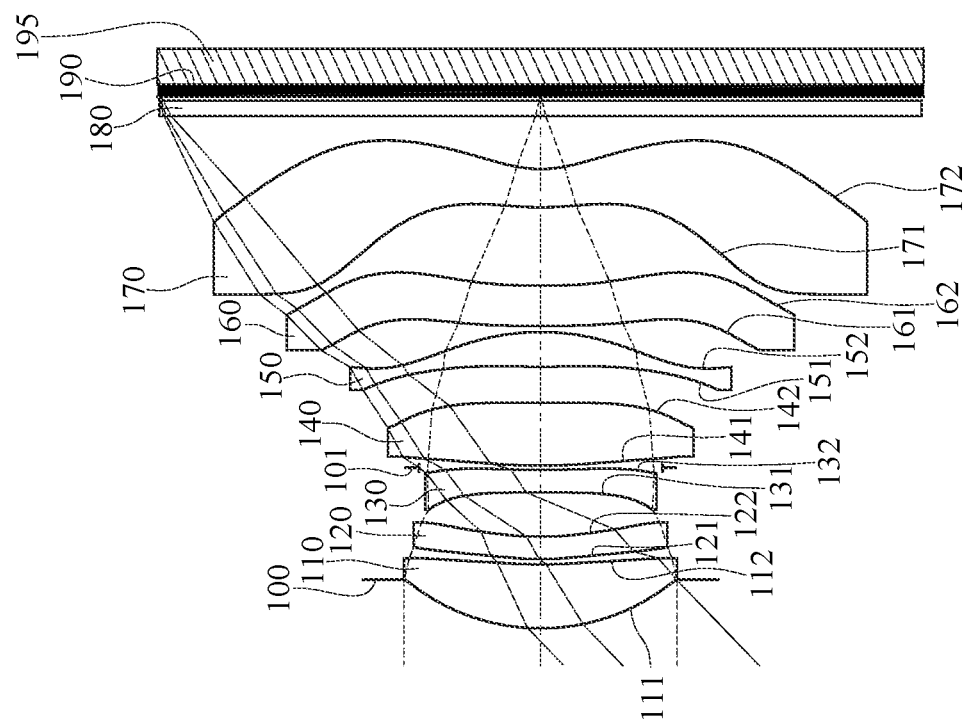
FIG. 1 is a schematic view of an image capturing unit according to the 1st embodiment of the present disclosure.

A photographing lens assembly includes, in order from an object side to an image side, a first lens element, a second lens element, a third lens element, a fourth lens element, a fifth lens element, a sixth lens element and a seventh lens element.

There can be an air gap in a paraxial region between every two of the lens elements of the photographing lens assembly that are adjacent to each other; that is, each of the first through the seventh lens elements can be a single and non-cemented lens element. The manufacturing process of the cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to displacement and it is thereby not favorable for the image quality. Therefore, having an air gap in a paraxial region between every two of the seven lens elements that are adjacent to each other in the present disclosure is favorable for reducing the complexity of lens molding processes and improving the image quality.

The first lens element can have positive refractive power; therefore, it is favorable for the incident light being converged together so as to travel into the photographing lens assembly. The first lens element can have an image-side surface being concave in a paraxial region thereof; therefore, it is favorable for projecting light with large angle of incidence onto an image surface and reducing the sensitivity of the photographing lens assembly.

The second lens element has positive refractive power; therefore, it is favorable for balancing the refractive power distribution at the object side so as to increase the light convergence capability, thereby reducing the total track length of the photographing lens assembly. The second lens element can have an image-side surface being concave in a paraxial region thereof; therefore, it is favorable for correcting aberrations so as to improve the image quality.

The third lens element has an image-side surface, and the image-side surface of the third lens element can have at least one inflection point. Therefore, the shape of the image-side surface of the third lens element is favorable for correcting off-axis aberrations so as to improve the image quality.

The fourth lens element can have positive refractive power; therefore, it is favorable for reducing the total track length of the photographing lens assembly so as to achieve compactness. The fourth lens element can have an object-side surface being convex in a paraxial region thereof; therefore, it is favorable for strengthening the refractive power of the fourth lens element so as to further reduce the total track length, thereby reducing the sensitivity of the photographing lens assembly.

The fifth lens element has an image-side surface, and the image-side surface of the fifth lens element can have at least one inflection point. Therefore, it is favorable for eliminating stray light generated by the incident light with large angle of incidence as well as increasing illuminance by reducing the incident angle of light projecting onto the image surface, thereby further improving the image quality.

The sixth lens element can have negative refractive power; therefore, it is favorable for correcting chromatic aberration so as to further improve the image quality. Either an object-side surface of the sixth lens element, an image-side surface of the sixth lens element or both the object-side surface and the image-side surface of the sixth lens element can have at least one inflection point; therefore, adjusting the shape of the surfaces of the sixth lens element is favorable for correcting off-axis distortion so as to prevent the image from appearing abnormally.

The seventh lens element can have an object-side surface being convex in a paraxial region thereof; therefore, controlling the shape of the object-side surface of the seventh lens element is favorable for correcting astigmatism so as to improve the image quality. The seventh lens element has an image-side surface being concave in a paraxial region thereof, and the image-side surface of the seventh lens element has at least one convex shape in an off-axis region thereof; therefore, it is favorable for reducing a back focal length of the photographing lens assembly so as to maintain a compact size thereof; also, it is favorable for correcting field curvature as well as reducing the incident angle of light projecting onto the image surface so as to improve the quality at the periphery of the image.

When a focal length of the photographing lens assembly is f, a curvature radius of the object-side surface of the sixth lens element is R11, and a curvature radius of the image-side surface of the sixth lens element is R12, the following condition is satisfied: $|f/R11|+|f/R12|<1.80$. Therefore, adjusting the shape of each surface of the sixth lens element is favorable for obtaining a balance between less molding problems and low sensitivity as well as correcting aberrations at the image side so as to improve the image quality. Preferably, the following condition can be satisfied: $|f/R11|+|f/R12|<1.40$. More preferably, the following condition can be satisfied: $|f/R11|+|f/R12|<0.95$. Much more preferably, the following condition can also be satisfied: $|f/R11|+|f/R12|<0.80$.

When a curvature radius of an object-side surface of the second lens element is R3, and a curvature radius of the image-side surface of the second lens element is R4, the following condition can be satisfied: $(R3+R4)/(R3-R4)<1.80$. Therefore, adjusting the shape of the second lens element is favorable for balancing the positive refractive power at the object side so as to reduce the total track length of the photographing lens assembly; furthermore, it is favorable for light with large angle of incidence traveling into the photographing lens assembly. Preferably, the following condition can be satisfied: $-25.0<(R3+R4)/(R3-R4)<1.50$. More preferably, the following condition can also be satisfied: $-20.0<(R3+R4)/(R3-R4)<1.0$.

When an axial distance between an object-side surface of the first lens element and the image surface is TL, and an entrance pupil diameter of the photographing lens assembly is EPD, the following condition can be satisfied: TL/EPD<2.80. Therefore, it is favorable for increasing aperture in a condition of short total track length so as to simultaneously satisfy the requirements of compactness and large aperture, thus the photographing lens assembly is applicable to various kinds of electronic devices. Preferably, the following condition can be satisfied: 1.0<TL/EPD<2.55. More preferably, the following condition can also be satisfied: 1.0<TL/EPD<2.20.

When the axial distance between the object-side surface of the first lens element and the image surface is TL, and a focal length of the sixth lens element is f6, the following condition can be satisfied: $|TL/f6|<0.65$. Therefore, it is favorable for properly arranging the total track length of the photographing lens assembly and the strength of the refractive power of the sixth lens element so as to reduce the sensitivity and achieve compactness. Preferably, the following condition can also be satisfied: $0.10<|TL/f6|<0.50$.

When the focal length of the photographing lens assembly is f, and the entrance pupil diameter of the photographing lens assembly is EPD, the following condition can be satisfied: f/EPD<2.0. Therefore, it is favorable for providing sufficient amount of incident light to increase illuminance on the image surface, so that an imaging capturing unit including the photographing lens assembly is able to capture enough image information in low light condition (for example, at night) or dynamic photography (for example, short exposure photography); furthermore, it is favorable for the electronic devices equipped with the imaging capturing unit generating high-quality images after image processing, thereby being usable under various conditions. Preferably, the following condition can also be satisfied: 0.80<f/EPD<1.80.

When the focal length of the photographing lens assembly is f, and a focal length of the first lens element is f1, the following condition can be satisfied: $-0.50$ $f/f1 \leq 0.88$. Therefore, it is favorable for properly arranging the strength of the refractive power of the first lens element so as to capture light with large angle of incidence and correct spherical aberration.

When the axial distance between the object-side surface of the first lens element and the image surface is TL, the entrance pupil diameter of the photographing lens assembly is EPD, and a maximum image height of the photographing lens assembly (half of a diagonal length of an effective photosensitive area of an image sensor) is ImgH, the following condition can be satisfied: $(TL)^2/(EPD \times ImgH)<4.10$. Therefore, it is favorable for properly arranging the specifications of the photographing lens assembly, such as the total track length, the size of aperture stop and the area of image surface, so as to be applicable to various kinds of electronic devices. Preferably, the following condition can be satisfied: $(TL)^2/(EPD \times ImgH)<3.80$. More preferably, the following condition can also be satisfied: $1.0<(TL)^2/(EPD \times ImgH)<3.30$.

When a curvature radius of an image-side surface of the fourth lens element is R8, and a curvature radius of an object-side surface of the fifth lens element is R9, the following condition can be satisfied: $(R8+R9)/(R8-R9)<7.50$. Therefore, both the image-side surface of the fourth lens element and the object-side surface of the fifth lens element have a proper shape which is favorable for assembling lens elements and correcting aberrations.

When a maximum value among axial distances between every two of the seven lens elements of the photographing lens assembly that are adjacent to each other is ATmax, and a minimum value among axial distances between every two of the seven lens elements of the photographing lens assembly that are adjacent to each other is ATmin, the following condition can be satisfied: 1.50<ATmax/ATmin<25.0. Therefore, balancing the configuration of the lens elements is favorable for effectively utilizing the space in the photographing lens assembly and increasing assembling yield rate. Preferably, the following condition can also be satisfied: 5.0<ATmax/ATmin<19.0.

When half of a maximum field of view of the photographing lens assembly is HFOV, the following condition can be satisfied: 38.0 [deg.]<HFOV<55.0 [deg.]. Therefore, it is favorable for providing sufficient field of view so as to expand the range of application.

When the axial distance between the object-side surface of the first lens element and the image surface is TL, and the maximum image height of the photographing lens assembly is ImgH, the following condition can be satisfied: 1.0<TL/

ImgH<1.80. Therefore, it is favorable for reducing the size of photographing lens assembly as well as increasing the area of image surface.

When an Abbe number of the first lens element is V1, and an Abbe number of the fourth lens element is V4, the following condition can be satisfied: |V1−V4|<25.0. Therefore, the materials of the first and the fourth lens elements are properly selected so as to increase the light convergence capability, thereby further reducing the total track length of the photographing lens assembly.

According to the present disclosure, the photographing lens assembly further includes an aperture stop. When an axial distance between the aperture stop and an object-side surface of the third lens element is Dsr5, and an axial distance between the aperture stop and the image-side surface of the third lens element is Dsr6, the following condition can be satisfied: |Dsr5/Dsr6|<1.0. Therefore, it is favorable for properly arranging the position of the aperture stop so as to reduce the total track length of the photographing lens assembly as well as improve the image-sensing efficiency of an image sensor.

When a curvature radius of the object-side surface of the seventh lens element is R13, and a curvature radius of the image-side surface of the seventh lens element is R14, the following condition can be satisfied: −4.0<(R13+R14)/(R13−R14)<4.0. Therefore, adjusting the shape of the seventh lens element is favorable for correcting aberrations at the image side of the photographing lens assembly so as to improve the image quality.

When the focal length of the first lens element is f1, and a focal length of the seventh lens element is f7, the following condition can be satisfied: |f7/f1|<4.0. Therefore, it is favorable for properly arranging the refractive power of the first lens element and the refractive power of the seventh lens element so as to obtain a balance between low sensitivity and compactness. Preferably, the following condition can also be satisfied: |f7/f1|<0.72.

When an Abbe number of the fifth lens element is V5, the following condition can be satisfied: 10.0<V5<40.0. Therefore, selecting the material of the fifth lens element is favorable for correcting chromatic aberration so as to prevent image overlap, thereby improving the image quality.

When an axial distance between the image-side surface of the seventh lens element and the image surface is BL, and the entrance pupil diameter of the photographing lens assembly is EPD, the following condition can be satisfied: BL/EPD≤0.35. Therefore, it is favorable for simultaneously reducing the back focal length and enlarging the aperture so as to keep the photographing lens assembly compact and increase brightness on the image surface.

When a minimum value among Abbe numbers of the seven lens elements of the photographing lens assembly is Vmin, the following condition can be satisfied: Vmin<21.5. Therefore, the arrangement of the material of each lens element is favorable for correcting chromatic aberration so as to maintain high image quality when the photographing lens assembly is with high specifications.

When the axial distance between the object-side surface of the first lens element and the image surface is TL, and an axial distance between the sixth lens element and the seventh lens element is T67, the following condition can be satisfied: 2.0<TL/T67<12.0. Therefore, adjusting the ratio of the total track length to the axial distance between the sixth lens element and the seventh lens element is favorable for satisfying the requirements of short total track length and large aperture as well as improving the image quality at the periphery of the image by correcting off-axis aberrations.

When a focal length of the second lens element is f2, and the focal length of the sixth lens element is f6, the following condition can be satisfied: |f2/f6|<3.20. Therefore, it is favorable for properly arranging the refractive power of the second lens element and the refractive power of the sixth lens element so as to obtain a balance among low sensitivity, compactness and high image quality, thereby providing good experience in photography. Preferably, the following condition can also be satisfied: |f2/f6|<1.0.

When an axial distance between the third lens element and the fourth lens element is T34, and an axial distance between the fifth lens element and the sixth lens element is T56, the following condition can be satisfied: 0<T34/T56<10.0. Therefore, the axial distances between each adjacent lens element are properly arranged so that it is favorable for assembling lens elements and increasing manufacturing yield rate.

When an Abbe number of the third lens element is V3, the Abbe number of the fifth lens element is V5, and an Abbe number of the sixth lens element is V6, the following condition can be satisfied: 30.0<V3+V5+V6<90.0. Therefore, the material of each lens element is properly selected so as to be favorable for improving the capability of correcting aberrations for the demand of higher specifications.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis. Furthermore, an inflection point is a point of the lens surface at which the surface changes from concave to convex, or vice versa.

According to the present disclosure, an image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly and the image surface for correction of aberrations such as field curvature. The optical properties of the image correction unit, such as curvature, thickness, index of refraction, position and surface shape (convex or concave surface with spherical, aspheric, diffraction or Fresnel morphology), can be adjusted according to the demand of an image capturing unit. In general, a preferable image correction unit is, for example, a light-permeable thin element having a concave object-side surface and a planar image-side surface, and the thin element is disposed near the image surface.

According to the present disclosure, the photographing lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the photographing lens assembly and thereby provides a wider field of view for the same.

According to the above description of the present disclosure, the following specific embodiments are provided for further explanation.

1st Embodiment

Figure 2:
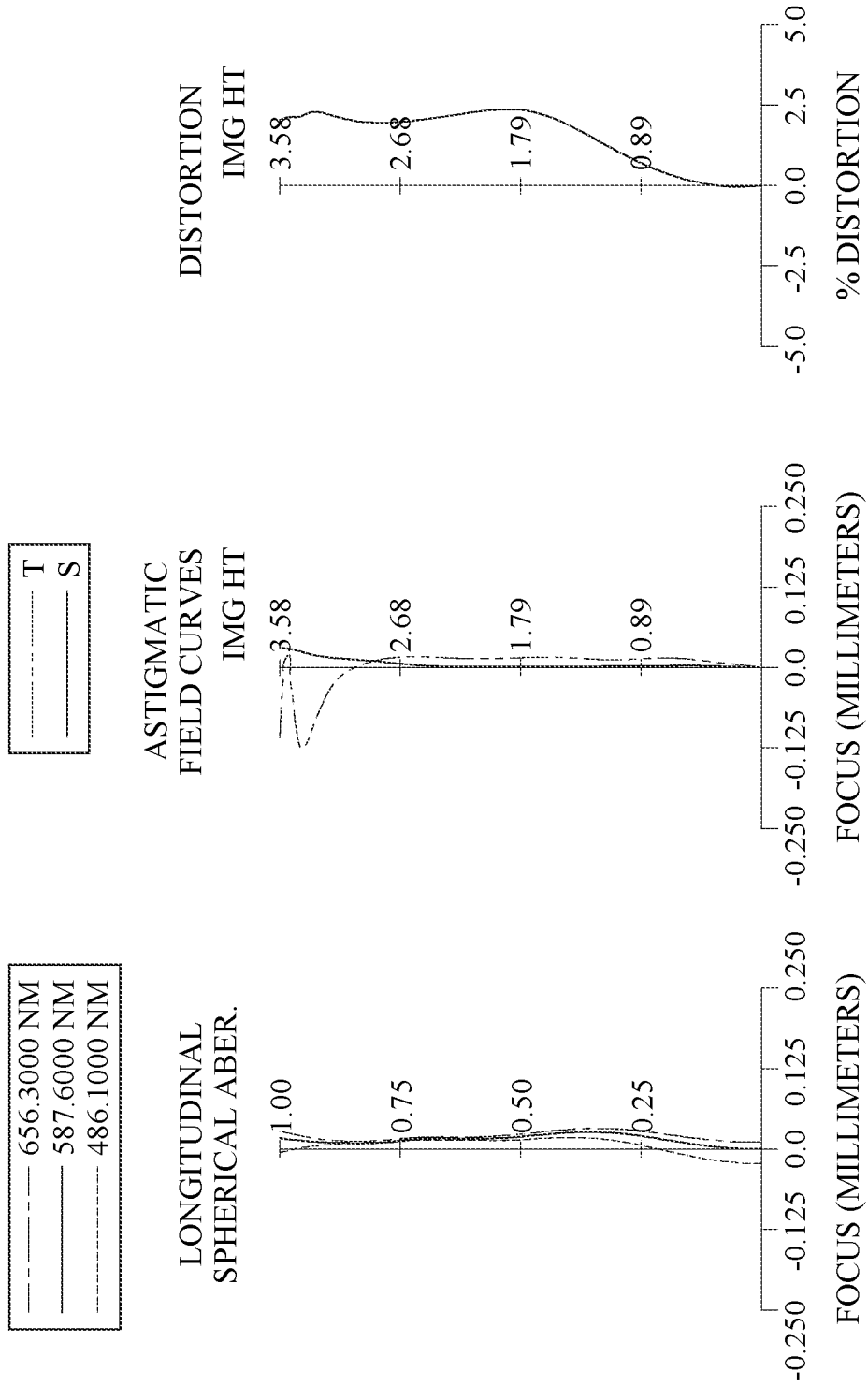
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 195. The photographing lens assembly includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, a filter 180 and an image surface 190. The photographing lens assembly includes seven single and non-cemented lens elements (110, 120, 130, 140, 150, 160 and 170) with no additional lens element disposed between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has at least one inflection point.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one inflection point.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. Both the object-side surface 161 and the image-side surface 162 of the sixth lens element 160 have at least one inflection point.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex shape in an off-axis region thereof.

The filter 180 is made of glass and located between the seventh lens element 170 and the image surface 190, and will not affect the focal length of the photographing lens assembly. The image sensor 195 is disposed on or near the image surface 190 of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=3.65 millimeters (mm), Fno=1.43, HFOV=43.7 degrees (deg.).

When an Abbe number of the fifth lens element 150 is V5, the following condition is satisfied: V5=37.4.

When an Abbe number of the first lens element 110 is V1, and an Abbe number of the fourth lens element 140 is V4, the following condition is satisfied:

|V1-V4|=0.1.

When an Abbe number of the third lens element 130 is V3, the Abbe number of the fifth lens element 150 is V5, and an Abbe number of the sixth lens element 160 is V6, the following condition is satisfied: V3+V5+V6=78.2.

When a minimum value among Abbe numbers of the seven lens elements of the photographing lens assembly is Vmin, the following condition is satisfied: Vmin=20.4. In this embodiment, the second lens element 120 has the same value of Abbe number as the third lens element 130 and the sixth lens element 160, and the Abbe numbers of the second lens element 120, the third lens element 130 and the sixth lens element 160 are all smaller than the Abbe numbers of the first lens element 110, the fourth lens element 140, the fifth lens element 150 and the seventh lens element 170. Thus, Vmin is equal to the Abbe number of the second lens element 120, the third lens element 130 or the sixth lens element 160.

When an axial distance between the third lens element 130 and the fourth lens element 140 is T34, and an axial distance between the fifth lens element 150 and the sixth lens element 160 is T56, the following condition is satisfied: T34/T56=0.67. In this embodiment, an axial distance between two adjacent lens elements is an air gap in a paraxial region between the two adjacent lens elements.

When a maximum value among axial distances between every two of the seven lens elements of the photographing lens assembly that are adjacent to each other is ATmax, and a minimum value among axial distances between every two of the seven lens elements of the photographing lens assembly that are adjacent to each other is ATmin, the following condition is satisfied: ATmax/ATmin=18.35. In this embodiment, ATmax is equal to an axial distance between the sixth lens element 160 and the seventh lens element 170, and ATmin is equal to the axial distance between the third lens element 130 and the fourth lens element 140.

When an axial distance between the object-side surface 111 of the first lens element 110 and the image surface 190 is TL, and the axial distance between the sixth lens element 160 and the seventh lens element 170 is T67, the following condition is satisfied: TL/T67=6.79.

When the axial distance between the object-side surface 111 of the first lens element 110 and the image surface 190 is TL, and an entrance pupil diameter of the photographing lens assembly is EPD, the following condition is satisfied: TL/EPD=1.95.

When the axial distance between the object-side surface 111 of the first lens element 110 and the image surface 190 is TL, and a focal length of the sixth lens element 160 is f6, the following condition is satisfied: |TL/f6|=0.50.

When a curvature radius of the object-side surface 121 of the second lens element 120 is R3, and a curvature radius of the image-side surface 122 of the second lens element 120 is R4, the following condition is satisfied: (R3+R4)/(R3−R4)=−19.85.

When a curvature radius of the image-side surface 142 of the fourth lens element 140 is R8, and a curvature radius of the object-side surface 151 of the fifth lens element 150 is R9, the following condition is satisfied: (R8+R9)/(R8−R9)=1.89.

When a curvature radius of the object-side surface 171 of the seventh lens element 170 is R13, and a curvature radius of the image-side surface 172 of the seventh lens element 170 is R14, the following condition is satisfied: (R13+R14)/(R13−R14)=2.52.

When the focal length of the photographing lens assembly is f, a curvature radius of the object-side surface 161 of the sixth lens element 160 is R11, and a curvature radius of the image-side surface 162 of the sixth lens element 160 is R12, the following condition is satisfied: |f/R11|+|f/R12|=0.55.

When the focal length of the photographing lens assembly is f, and the entrance pupil diameter of the photographing lens assembly is EPD, the following condition is satisfied: f/EPD=1.43.

When the focal length of the photographing lens assembly is f, and a focal length of the first lens element 110 is f1, the following condition is satisfied: f/f1=0.51.

When the focal length of the first lens element 110 is f1, and a focal length of the seventh lens element 170 is f7, the following condition is satisfied: |f7/f1|=0.51.

When a focal length of the second lens element 120 is f2, and the focal length of the sixth lens element 160 is f6, the following condition is satisfied: |f2/f6|=3.04

When the axial distance between the object-side surface 111 of the first lens element 110 and the image surface 190 is TL, the entrance pupil diameter of the photographing lens assembly is EPD, and a maximum image height of the photographing lens assembly is ImgH, the following condition is satisfied: $(TL)^2/(EPD \times ImgH)=2.72$.

When an axial distance between the image-side surface 172 of the seventh lens element 170 and the image surface 190 is BL, and the entrance pupil diameter of the photographing lens assembly is EPD, the following condition is satisfied: BL/EPD=0.27.

When the axial distance between the object-side surface 111 of the first lens element 110 and the image surface 190 is TL, and the maximum image height of the photographing lens assembly is ImgH, the following condition is satisfied: TL/ImgH=1.39.

When an axial distance between the aperture stop 100 and the object-side surface 131 of the third lens element 130 is Dsr5, and an axial distance between the aperture stop 100 and the image-side surface 132 of the third lens element 130 is Dsr6, the following condition is satisfied: |Dsr5/Dsr6|=0.80.

The detailed optical data of the 1st embodiment are shown in Table 1 and the aspheric surface data are shown in Table 2 below.

TABLE 1

1st Embodiment
f = 3.65 mm, Fno = 1.43, HFOV = 43.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.454 | | | | |

TABLE 1-continued

1st Embodiment
f = 3.65 mm, Fno = 1.43, HFOV = 43.7 deg.

| Surface # | | Curvature Radius | | Thickness | Material | Index | Abbe # | Focal Length |
|---|---|---|---|---|---|---|---|---|
| 2 | Lens 1 | 1.987 | (ASP) | 0.599 | Plastic | 1.545 | 56.0 | 7.20 |
| 3 | | 3.601 | (ASP) | 0.050 | | | | |
| 4 | Lens 2 | 2.537 | (ASP) | 0.210 | Plastic | 1.660 | 20.4 | 30.59 |
| 5 | | 2.806 | (ASP) | 0.415 | | | | |
| 6 | Lens 3 | −43.478 | (ASP) | 0.210 | Plastic | 1.660 | 20.4 | −8.46 |
| 7 | | 6.420 | (ASP) | 0.020 | | | | |
| 8 | Stop | Plano | | 0.020 | | | | |
| 9 | Lens 4 | 4.137 | (ASP) | 0.591 | Plastic | 1.544 | 55.9 | 8.67 |
| 10 | | 32.146 | (ASP) | 0.339 | | | | |
| 11 | Lens 5 | 9.897 | (ASP) | 0.324 | Plastic | 1.566 | 37.4 | 3.22 |
| 12 | | −2.204 | (ASP) | 0.060 | | | | |
| 13 | Lens 6 | −103.937 | (ASP) | 0.374 | Plastic | 1.660 | 20.4 | −10.07 |
| 14 | | 7.109 | (ASP) | 0.734 | | | | |
| 15 | Lens 7 | 2.460 | (ASP) | 0.360 | Plastic | 1.566 | 37.4 | −3.64 |
| 16 | | 1.061 | (ASP) | 0.500 | | | | |
| 17 | Filter | Plano | | 0.140 | Glass | 1.517 | 64.2 | — |
| 18 | | Plano | | 0.038 | | | | |
| 19 | Image | Plano | | — | | | | |

Note:
Reference wavelength is 587.6 nm (d-line).
An effective radius of the stop 101 (Surface 8) is 1.140 mm.

TABLE 2

Aspheric Coefficients

| Surface # | 2 | 3 | 4 | 5 | 6 |
|---|---|---|---|---|---|
| k = | 1.2123E−01 | −8.1463E+01 | −2.9606E+01 | −2.1118E+01 | −6.0311E+01 |
| A4 = | −6.0847E−03 | −1.1534E−01 | −1.5342E−01 | −3.8433E−03 | −8.5367E−02 |
| A6 = | 4.6187E−03 | 2.0543E−01 | 2.5024E−01 | −2.1262E−01 | −3.3252E−02 |
| A8 = | 1.3332E−02 | −1.8722E−01 | −2.0425E−01 | 1.3221E−01 | 4.2346E−02 |
| A10 = | −3.0928E−02 | 9.3754E−02 | 8.9312E−02 | −1.9097E−01 | −6.8905E−02 |
| A12 = | 2.3951E−02 | −1.7944E−02 | −1.0768E−02 | 1.0349E−01 | 2.3887E−02 |
| A14 = | −6.8343E−03 | −4.7086E−03 | −8.3259E−03 | −1.5615E−02 | 2.2434E−03 |
| A16 = | 1.0571E−04 | 1.8878E−03 | 3.2717E−03 | −4.1970E−03 | — |

| Surface # | 7 | 9 | 10 | 11 | 12 |
|---|---|---|---|---|---|
| k = | −4.5124E+01 | −7.6236E+01 | −5.1486E+01 | −2.4133E+01 | −9.3591E−01 |
| A4 = | −1.4287E−01 | −4.7385E−02 | −1.1216E−01 | −1.8206E−01 | −1.5561E−02 |
| A6 = | 1.6961E−01 | 8.9384E−02 | 9.7452E−02 | 1.6139E−01 | 2.2722E−02 |
| A8 = | −1.7831E−01 | −8.2708E−02 | −1.1421E−01 | −8.4901E−02 | 7.6147E−03 |
| A10 = | 8.1342E−02 | 3.3379E−02 | 8.0023E−02 | 2.4896E−02 | −5.2593E−03 |
| A12 = | −1.0124E−02 | −4.2789E−03 | −3.2122E−02 | −3.9237E−03 | 8.8602E−04 |
| A14 = | — | — | 5.7028E−03 | 2.6923E−04 | −4.5508E−05 |
| A16 = | — | — | — | — | −7.5216E−07 |

| Surface # | 13 | 14 | 15 | 16 |
|---|---|---|---|---|
| k = | −3.8831E+00 | 6.3993E+00 | −2.5446E+01 | −5.7271E+00 |
| A4 = | 1.5908E−01 | 9.9712E−02 | −2.2716E−01 | −1.0536E−01 |
| A6 = | −1.6100E−01 | −1.1966E−01 | 1.2811E−01 | 5.4410E−02 |
| A8 = | 7.3714E−02 | 5.5794E−02 | −5.8666E−02 | −1.9631E−02 |
| A10 = | −2.0051E−02 | −1.5855E−02 | 1.7180E−02 | 4.1573E−03 |
| A12 = | 2.9614E−03 | 2.6818E−03 | −2.7854E−03 | −5.0056E−04 |
| A14 = | −1.7671E−04 | −2.4062E−04 | 2.3067E−04 | 3.1903E−05 |
| A16 = | — | 8.6462E−06 | −7.6706E−06 | −8.3637E−07 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
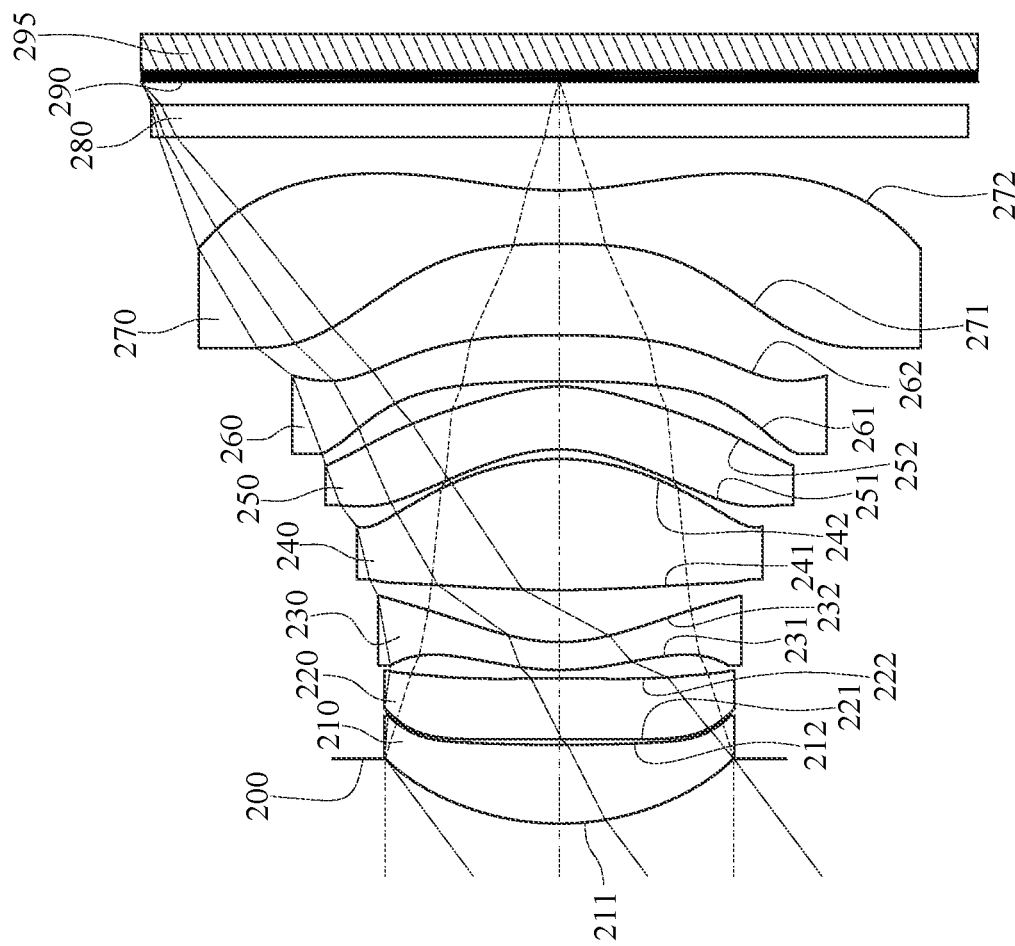
FIG. 3 is a schematic view of an image capturing unit according to the 2nd embodiment of the present disclosure.
Figure 4:
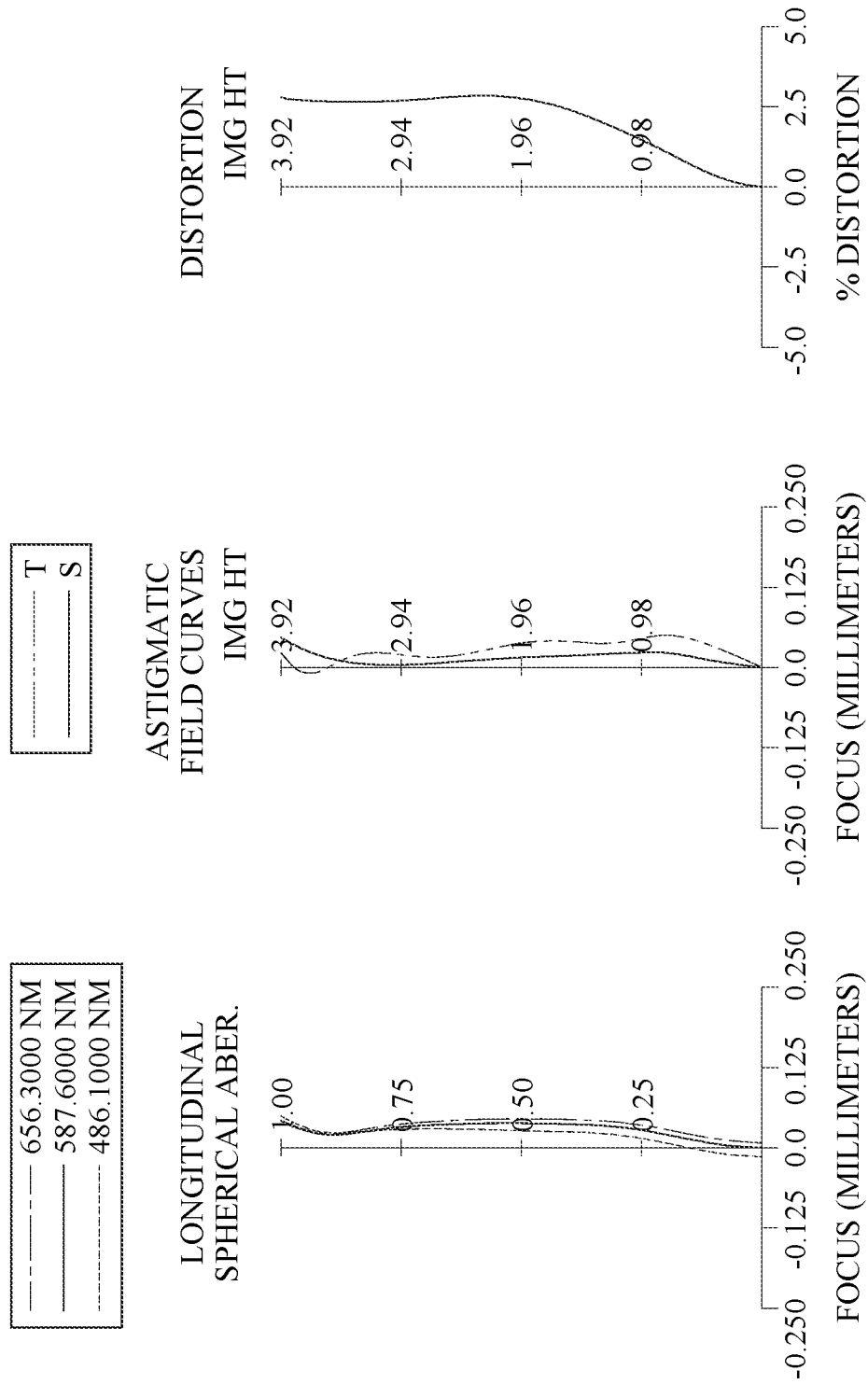
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 295. The photographing lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, a filter 280 and an image surface 290. The photographing lens assembly includes seven single and non-cemented lens elements (210, 220, 230, 240, 250, 260 and 270) with no additional lens element disposed between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. Both the object-side surface 261 and the image-side surface 262 of the sixth lens element 260 have at least one inflection point.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one convex shape in an off-axis region thereof.

The filter 280 is made of glass and located between the seventh lens element 270 and the image surface 290, and will not affect the focal length of the photographing lens assembly. The image sensor 295 is disposed on or near the image surface 290 of the photographing lens assembly.

The detailed optical data of the 2nd embodiment are shown in Table 3 and the aspheric surface data are shown in Table 4 below.

TABLE 3

2nd Embodiment
f = 5.06 mm, Fno = 1.55, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.608 | | | | |
| 2 | Lens 1 | 2.571 | (ASP) | 0.736 | Plastic | 1.544 | 56.0 | 5.78 |
| 3 | | 12.642 | (ASP) | 0.057 | | | | |
| 4 | Lens 2 | −74.009 | (ASP) | 0.567 | Plastic | 1.544 | 56.0 | 53.28 |
| 5 | | −20.884 | (ASP) | 0.080 | | | | |
| 6 | Lens 3 | 2.385 | (ASP) | 0.260 | Plastic | 1.639 | 23.5 | −9.39 |
| 7 | | 1.634 | (ASP) | 0.490 | | | | |
| 8 | Lens 4 | 11.626 | (ASP) | 1.228 | Plastic | 1.544 | 56.0 | 3.34 |
| 9 | | −2.073 | (ASP) | 0.090 | | | | |
| 10 | Lens 5 | −1.424 | (ASP) | 0.589 | Plastic | 1.634 | 23.8 | −108.68 |
| 11 | | −1.688 | (ASP) | 0.050 | | | | |
| 12 | Lens 6 | −17.881 | (ASP) | 0.429 | Plastic | 1.614 | 26.0 | −83.15 |
| 13 | | −27.778 | (ASP) | 0.860 | | | | |
| 14 | Lens 7 | −7.966 | (ASP) | 0.500 | Plastic | 1.534 | 55.9 | −4.11 |
| 15 | | 3.099 | (ASP) | 0.500 | | | | |
| 16 | Filter | Plano | | 0.300 | Glass | 1.517 | 64.2 | — |
| 17 | | Plano | | 0.214 | | | | |
| 18 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | −1.5523E+00 | −2.0954E+01 | −3.3619E+00 | −1.0000E+00 | −1.5093E+00 |
| A4 = | 1.0599E−02 | −2.5037E−02 | −3.1524E−03 | 4.6926E−02 | −9.4761E−02 |
| A6 = | 1.7788E−03 | 2.0292E−02 | 2.1643E−02 | −1.5196E−02 | 4.5017E−02 |
| A8 = | −1.2771E−03 | −8.7210E−03 | −1.6771E−02 | 5.0327E−03 | −4.0374E−02 |
| A10 = | 9.6918E−04 | 4.5243E−03 | 1.1051E−02 | −6.6234E−03 | 2.2020E−02 |
| A12 = | −4.3131E−04 | 1.9186E−03 | −5.2990E−04 | 5.4235E−03 | −7.6499E−03 |
| A14 = | 1.8078E−04 | −1.4042E−03 | −1.1647E−03 | −2.1161E−03 | 1.5482E−03 |
| A16 = | −2.9294E−05 | 1.8900E−04 | 2.2408E−04 | 3.2064E−04 | −1.4159E−04 |

| Surface # | 7 | 8 | 9 | 10 | 11 |
|---|---|---|---|---|---|
| k = | −3.2480E+00 | −1.0000E+00 | −3.1180E+00 | −1.1951E+00 | −5.1499E+00 |
| A4 = | −5.6340E−02 | −7.4477E−03 | 6.7859E−03 | 1.3165E−01 | 2.5230E−02 |
| A6 = | 3.9870E−02 | 7.0249E−03 | −3.1564E−02 | −9.2973E−02 | −2.1217E−03 |
| A8 = | −2.7116E−02 | −1.2646E−02 | 1.8215E−02 | 5.5020E−02 | −8.5040E−03 |
| A10 = | 1.1332E−02 | 1.3779E−02 | −2.2330E−03 | −2.2317E−02 | 4.1235E−03 |
| A12 = | −2.8391E−03 | −8.5453E−03 | −1.5897E−03 | 5.9484E−03 | −9.1531E−04 |
| A14 = | 5.0550E−04 | 2.5686E−03 | 6.2095E−04 | −8.8843E−04 | 1.1323E−04 |
| A16 = | −5.4542E−05 | −2.8558E−04 | −6.0668E−05 | 5.4402E−05 | −6.3605E−06 |

| Surface # | 12 | 13 | 14 | 15 |
|---|---|---|---|---|
| k = | 4.5626E+00 | 6.4513E+00 | −6.6930E+00 | −1.4876E+01 |
| A4 = | −4.5464E−02 | −1.0274E−01 | −8.0545E−02 | −2.1049E−02 |
| A6 = | 4.7110E−02 | 7.2963E−02 | 1.9314E−02 | 2.1789E−03 |
| A8 = | −3.7405E−02 | −3.6222E−02 | −2.6261E−03 | 1.4977E−04 |
| A10 = | 1.4840E−02 | 1.0607E−02 | 3.9119E−04 | −9.3967E−05 |
| A12 = | −3.4001E−03 | −1.6772E−03 | −4.8759E−05 | 1.3266E−05 |
| A14 = | 4.3644E−04 | 1.3437E−04 | 3.2908E−06 | −8.5447E−07 |
| A16 = | −2.3716E−05 | −4.3091E−06 | −8.6817E−08 | 2.1338E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.06 | (R3 + R4)/(R3 − R4) | 1.79 |
| Fno | 1.55 | (R8 + R9)/(R8 − R9) | 5.39 |
| HFOV [deg.] | 36.8 | (R13 + R14)/(R13 − R14) | 0.44 |
| V5 | 23.8 | \|f/R11\| + \|f/R12\| | 0.47 |
| \|V1 − V4\| | 0.0 | f/EPD | 1.55 |
| V3 + V5 + V6 | 73.3 | f/f1 | 0.88 |
| Vmin | 23.5 | \|f7/f1\| | 0.71 |
| T34/T56 | 9.79 | \|f2/f6\| | 0.64 |
| ATmax/ATmin | 17.19 | (TL)$^2$/(EPD × ImgH) | 3.77 |
| TL/T67 | 8.08 | BL/EPD | 0.31 |
| TL/EPD | 2.13 | TL/ImgH | 1.77 |
| \|TL/f6\| | 0.08 | \|Dsr5/Dsr6\| | 0.76 |

3rd Embodiment

Figure 5:
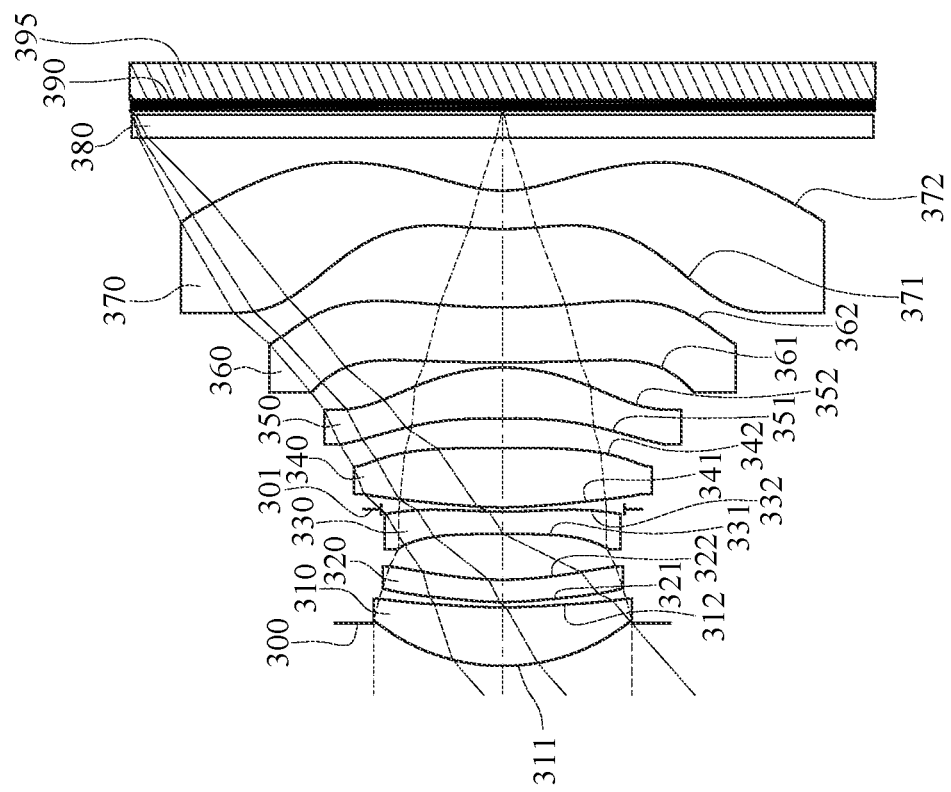
FIG. 5 is a schematic view of an image capturing unit according to the 3rd embodiment of the present disclosure.
Figure 6:
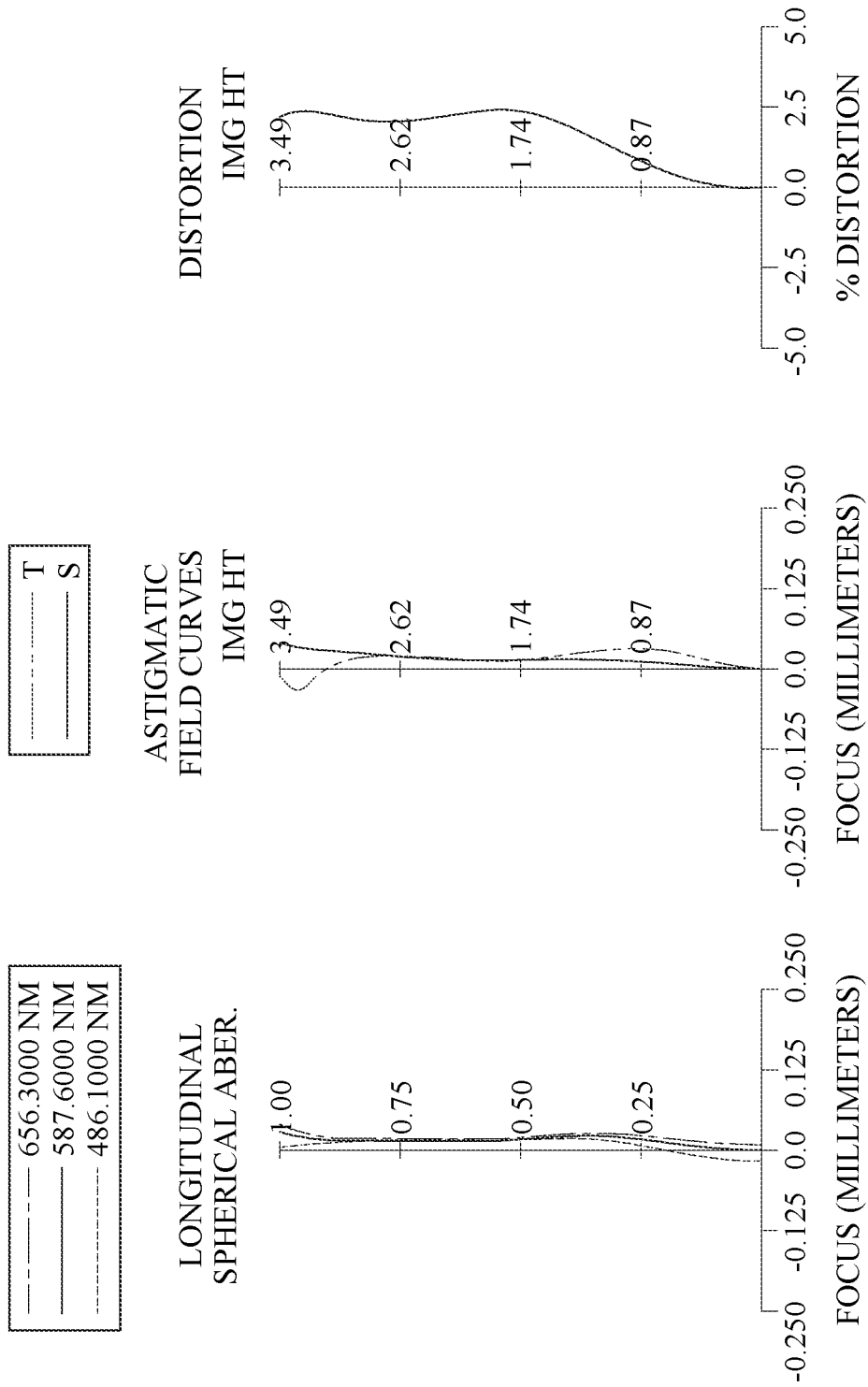
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 395. The photographing lens assembly includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, a filter 380 and an image surface 390. The photographing lens assembly includes seven single and non-cemented lens elements (310, 320, 330, 340, 350, 360 and 370) with no additional lens element disposed between the first lens element 310 and the seventh lens element 370.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one inflection point.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Both the object-side surface 361 and the image-side surface 362 of the sixth lens element 360 have at least one inflection point.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one convex shape in an off-axis region thereof.

The filter 380 is made of glass and located between the seventh lens element 370 and the image surface 390, and will not affect the focal length of the photographing lens assembly. The image sensor 395 is disposed on or near the image surface 390 of the photographing lens assembly.

The detailed optical data of the 3rd embodiment are shown in Table 5 and the aspheric surface data are shown in Table 6 below.

TABLE 5

3rd Embodiment
f = 3.87 mm, Fno = 1.60, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.401 | | | | |
| 2 | Lens 1 | 1.942 | (ASP) | 0.548 | Plastic | 1.545 | 56.0 | 6.53 |
| 3 | | 3.854 | (ASP) | 0.050 | | | | |
| 4 | Lens 2 | 2.670 | (ASP) | 0.210 | Plastic | 1.660 | 20.4 | 32.47 |
| 5 | | 2.954 | (ASP) | 0.429 | | | | |
| 6 | Lens 3 | −36.300 | (ASP) | 0.210 | Plastic | 1.660 | 20.4 | −6.79 |
| 7 | | 5.122 | (ASP) | 0.020 | | | | |
| 8 | Stop | Plano | | 0.020 | | | | |
| 9 | Lens 4 | 3.577 | (ASP) | 0.554 | Plastic | 1.544 | 55.9 | 7.35 |
| 10 | | 32.258 | (ASP) | 0.280 | | | | |
| 11 | Lens 5 | −12.956 | (ASP) | 0.477 | Plastic | 1.566 | 37.4 | 3.69 |
| 12 | | −1.824 | (ASP) | 0.050 | | | | |
| 13 | Lens 6 | 241.331 | (ASP) | 0.514 | Plastic | 1.660 | 20.4 | −11.08 |
| 14 | | 7.092 | (ASP) | 0.733 | | | | |
| 15 | Lens 7 | 2.484 | (ASP) | 0.360 | Plastic | 1.566 | 37.4 | −4.00 |
| 16 | | 1.123 | (ASP) | 0.500 | | | | |
| 17 | Filter | Plano | | 0.210 | Glass | 1.517 | 64.2 | — |
| 18 | | Plano | | 0.038 | | | | |
| 19 | Image | Plano | | — | | | | |

Note:
Reference wavelength is 587.6 nm (d-line).
An effective radius of the stop 301 (Surface 8) is 1.140 mm.

TABLE 6

Aspheric Coefficients

| Surface # | 2 | 3 | 4 | 5 | 6 |
|---|---|---|---|---|---|
| k = | 2.1713E−01 | −9.0000E+01 | −3.0632E+01 | −2.5882E+01 | −6.0311E+01 |
| A4 = | −2.9169E−03 | −9.8029E−02 | −1.3743E−01 | 9.8960E−04 | −1.1894E−01 |
| A6 = | −1.2053E−03 | 1.9760E−01 | 2.5630E−01 | −2.0849E−02 | −2.8350E−02 |
| A8 = | 1.7264E−02 | −1.7945E−01 | −2.0890E−01 | 1.2886E−01 | 1.0646E−01 |
| A10 = | −3.2103E−02 | 9.2899E−02 | 8.8960E−02 | −1.9579E−01 | −2.0366E−01 |
| A12 = | 2.5543E−02 | −2.0712E−02 | −8.3585E−03 | 1.0634E−01 | 1.5009E−01 |
| A14 = | −7.9010E−03 | −3.8762E−03 | −9.5976E−03 | −7.3522E−03 | −4.0880E−02 |
| A16 = | 1.0571E−04 | 2.0670E−03 | 3.9777E−03 | −9.5946E−03 | — |

| Surface # | 7 | 9 | 10 | 11 | 12 |
|---|---|---|---|---|---|
| k = | −4.5124E+01 | −7.6236E+01 | −5.1486E+01 | 2.6178E+01 | −1.2174E+00 |
| A4 = | −1.6352E−01 | −1.6723E−02 | −1.2828E−01 | −1.6146E−01 | −2.7921E−03 |
| A6 = | 2.1549E−01 | 6.0414E−02 | 1.2080E−01 | 1.4214E−01 | 2.0933E−02 |
| A8 = | −2.3736E−01 | −6.4540E−02 | −1.2200E−01 | −6.8560E−02 | −5.0844E−03 |
| A10 = | 1.2786E−01 | 2.6468E−02 | 8.5025E−02 | 1.9351E−02 | 5.1805E−03 |
| A12 = | −2.3243E−02 | −2.8534E−03 | −3.7251E−02 | −2.4277E−03 | −1.4385E−03 |
| A14 = | — | — | 7.4905E−03 | 3.3997E−05 | −1.1678E−04 |
| A16 = | — | — | — | — | 4.4890E−05 |

TABLE 6-continued

Aspheric Coefficients

| Surface # | 13 | 14 | 15 | 16 |
|---|---|---|---|---|
| k = | 9.0000E+01 | 5.9174E+00 | −2.2876E+01 | −5.6277E+00 |
| A4 = | 6.5720E−02 | 4.1774E−03 | −2.1340E−01 | −1.0049E−01 |
| A6 = | −6.4717E−02 | −2.9107E−02 | 1.0811E−01 | 4.7888E−02 |
| A8 = | 1.8635E−02 | 8.6132E−03 | −4.6204E−02 | −1.5981E−02 |
| A10 = | −1.1524E−03 | −7.2022E−04 | 1.3371E−02 | 3.2245E−03 |
| A12 = | −9.6761E−04 | −3.2799E−04 | −2.1813E−03 | −3.7548E−04 |
| A14 = | 1.8365E−04 | 9.7157E−05 | 1.8280E−04 | 2.3344E−05 |
| A16 = | — | −7.3936E−06 | −6.1741E−06 | −6.0148E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.87 | (R3 + R4)/(R3 − R4) | −19.76 |
| Fno | 1.60 | (R8 + R9)/(R8 − R9) | 0.43 |
| HFOV [deg.] | 41.3 | (R13 + R14)/(R13 − R14) | 2.65 |
| V5 | 37.4 | $|f/R11| + |f/R12|$ | 0.56 |
| $|V1 − V4|$ | 0.1 | f/EPD | 1.60 |
| V3 + V5 + V6 | 78.2 | f/f1 | 0.59 |
| Vmin | 20.4 | $|f7/f1|$ | 0.61 |
| T34/T56 | 0.80 | $|f2/f6|$ | 2.93 |
| ATmax/ATmin | 18.33 | $(TL)^2/(EPD × ImgH)$ | 3.21 |
| TL/T67 | 7.10 | BL/EPD | 0.31 |
| TL/EPD | 2.15 | TL/ImgH | 1.49 |
| $|TL/f6|$ | 0.47 | $|Dsr5/Dsr6|$ | 0.80 |

4th Embodiment

Figure 7:
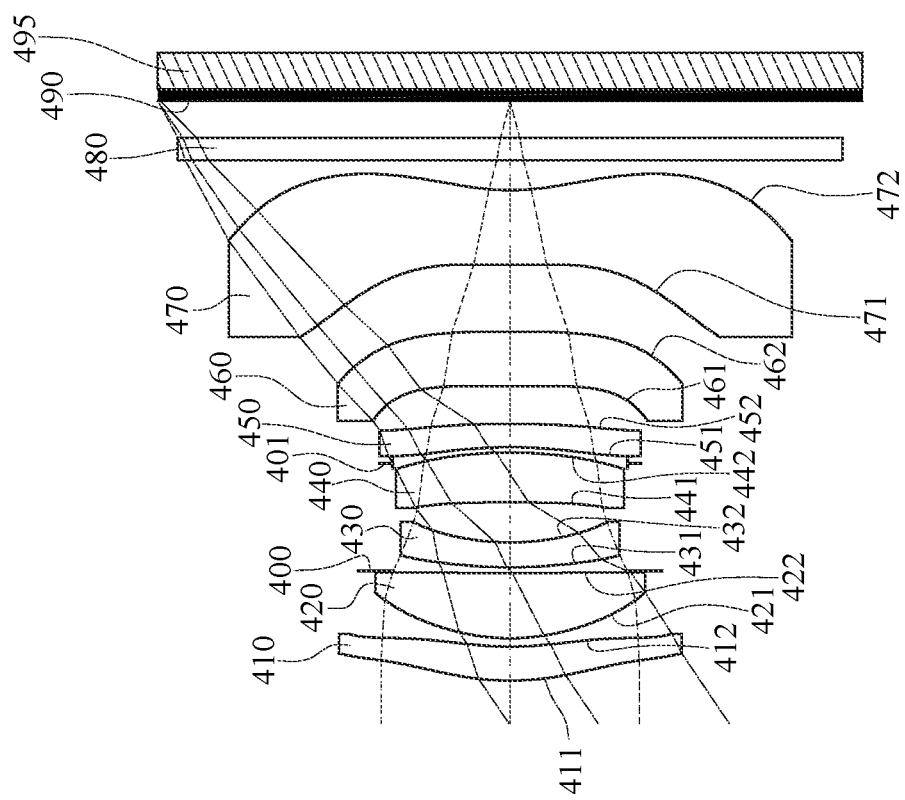
FIG. 7 is a schematic view of an image capturing unit according to the 4th embodiment of the present disclosure.
Figure 8:
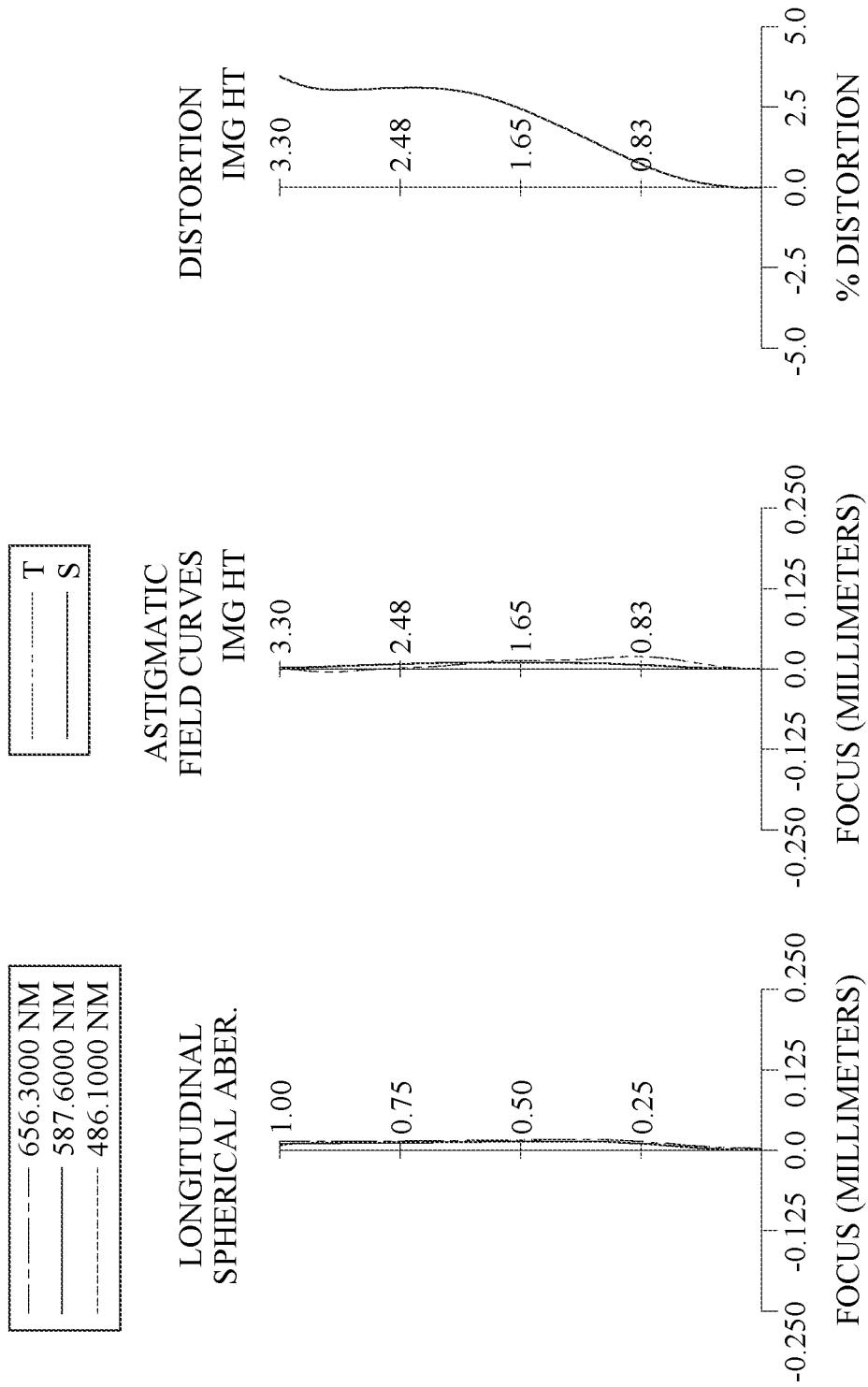
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 495. The photographing lens assembly includes, in order from an object side to an image side, a first lens element 410, a second lens element 420, an aperture stop 400, a third lens element 430, a fourth lens element 440, a stop 401, a fifth lens element 450, a sixth lens element 460, a seventh lens element 470, a filter 480 and an image surface 490. The photographing lens assembly includes seven single and non-cemented lens elements (410, 420, 430, 440, 450, 460 and 470) with no additional lens element disposed between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The image-side surface 472 of the seventh lens element 470 has at least one convex shape in an off-axis region thereof.

The filter 480 is made of glass and located between the seventh lens element 470 and the image surface 490, and will not affect the focal length of the photographing lens assembly. The image sensor 495 is disposed on or near the image surface 490 of the photographing lens assembly.

The detailed optical data of the 4th embodiment are shown in Table 7 and the aspheric surface data are shown in Table 8 below.

TABLE 7

4th Embodiment
f = 4.69 mm, Fno = 1.94, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.458 | (ASP) | 0.319 | Plastic | 1.544 | 55.9 | 20.18 |
| 2 | | 3.022 | (ASP) | 0.078 | | | | |
| 3 | Lens 2 | 1.936 | (ASP) | 0.610 | Plastic | 1.544 | 55.9 | 3.66 |
| 4 | | 59.126 | (ASP) | 0.021 | | | | |
| 5 | Ape. Stop | Plano | | 0.035 | | | | |
| 6 | Lens 3 | 4.488 | (ASP) | 0.232 | Plastic | 1.671 | 19.3 | −7.12 |
| 7 | | 2.266 | (ASP) | 0.377 | | | | |
| 8 | Lens 4 | −25.229 | (ASP) | 0.466 | Plastic | 1.544 | 56.0 | 9.03 |
| 9 | | −4.140 | (ASP) | −0.030 | | | | |
| 10 | Stop | Plano | | 0.080 | | | | |
| 11 | Lens 5 | −4.390 | (ASP) | 0.218 | Plastic | 1.634 | 23.8 | −9.94 |
| 12 | | −14.744 | (ASP) | 0.354 | | | | |
| 13 | Lens 6 | 18.352 | (ASP) | 0.512 | Plastic | 1.671 | 19.3 | 16.78 |
| 14 | | −28.811 | (ASP) | 0.626 | | | | |
| 15 | Lens 7 | 10.300 | (ASP) | 0.700 | Plastic | 1.534 | 55.9 | −4.92 |
| 16 | | 2.044 | (ASP) | 0.280 | | | | |
| 17 | Filter | Plano | | 0.210 | Glass | 1.517 | 64.2 | — |
| 18 | | Plano | | 0.344 | | | | |
| 19 | Image | Plano | | — | | | | |

Note:
Reference wavelength is 587.6 nm (d-line).
An effective radius of the stop 401 (Surface 10) is 1.100 mm.

TABLE 8

Aspheric Coefficients

| Surface # | 1 | 2 | 3 | 4 | 6 |
|---|---|---|---|---|---|
| k = | −3.4859E−01 | −1.9075E+00 | −1.0591E+00 | −8.9099E+01 | −7.3508E+00 |
| A4 = | −4.1118E−02 | −1.0342E−01 | −3.1433E−02 | 2.9757E−02 | −2.3965E−02 |
| A6 = | −1.3642E−02 | 8.0104E−05 | 1.4558E−02 | −5.2007E−02 | 2.2282E−02 |
| A8 = | −7.6409E−03 | 3.7340E−02 | 2.1952E−02 | 1.9698E−02 | −8.8469E−03 |
| A10 = | 9.9717E−03 | −2.5650E−02 | −1.0742E−02 | 5.4782E−03 | 1.9890E−02 |
| A12 = | −2.4112E−02 | 9.0680E−03 | −3.2682E−03 | −5.3353E−03 | −5.7875E−03 |
| A14 = | 1.3945E−04 | −1.2685E−03 | 2.4205E−03 | 1.2706E−03 | −1.8964E−03 |

| Surface # | 7 | 8 | 9 | 11 | 12 |
|---|---|---|---|---|---|
| k = | −1.5588E+01 | −7.7796E+01 | 2.6854E+00 | −8.8166E+00 | 2.0000E+01 |
| A4 = | 1.1898E−01 | −5.4556E−02 | 3.6348E−02 | 3.5686E−02 | −4.6109E−02 |
| A6 = | −1.4678E−01 | 1.9067E−02 | −2.0190E−01 | −1.4731E−01 | 1.9557E−02 |
| A8 = | 2.8781E−01 | −1.1892E−01 | 3.7036E−01 | 3.2251E−01 | 2.8462E−02 |
| A10 = | −3.2067E−01 | 2.6551E−01 | −3.4458E−01 | −2.9490E−01 | −3.5223E−02 |
| A12 = | 2.3199E−01 | −2.9504E−01 | 1.7606E−01 | 1.3603E−01 | 2.0784E−02 |
| A14 = | −6.7022E−02 | 1.8686E−01 | −4.1589E−02 | −2.7427E−02 | −4.7973E−03 |
| A16 = | — | −4.9104E−02 | — | — | — |

| Surface # | 13 | 14 | 15 | 16 |
|---|---|---|---|---|
| k = | −5.0000E+01 | −1.0000E+00 | −2.2083E+01 | −1.1136E+01 |
| A4 = | −1.1099E−01 | −7.9075E−02 | −1.9385E−01 | −5.3483E−02 |
| A6 = | 5.9054E−02 | 4.7259E−02 | 1.0744E−01 | 1.6294E−02 |
| A8 = | −1.3200E−01 | −5.8760E−02 | −5.8107E−02 | −4.3770E−03 |
| A10 = | 1.3827E−01 | 3.9664E−02 | 2.3628E−02 | 7.2847E−04 |
| A12 = | −8.9998E−02 | −1.5544E−02 | −5.8463E−03 | −6.8888E−05 |
| A14 = | 3.1304E−02 | 3.2723E−03 | 7.8473E−04 | 2.7532E−06 |
| A16 = | −4.9050E−03 | −2.8522E−04 | −4.3775E−05 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.69 | (R3 + R4)/(R3 − R4) | −1.07 |
| Fno | 1.94 | (R8 + R9)/(R8 − R9) | −34.15 |
| HFOV [deg.] | 34.1 | (R13 + R14)/(R13 − R14) | 1.50 |
| V5 | 23.8 | |f/R11| + |f/R12| | 0.42 |
| |V1 − V4| | 0.1 | f/EPD | 1.94 |
| V3 + V5 + V6 | 62.4 | f/f1 | 0.23 |
| Vmin | 19.3 | |f7/f1| | 0.24 |

-continued

| 4th Embodiment | | | |
|---|---|---|---|
| T34/T56 | 1.06 | \|f2/f6\| | 0.22 |
| ATmax/ATmin | 12.52 | (TL)²/(EPD × ImgH) | 3.70 |
| TL/T67 | 8.68 | BL/EPD | 0.35 |
| TL/EPD | 2.25 | TL/ImgH | 1.65 |
| \|TL/f6\| | 0.32 | \|Dsr5/Dsr6\| | 0.13 |

5th Embodiment

Figure 9:
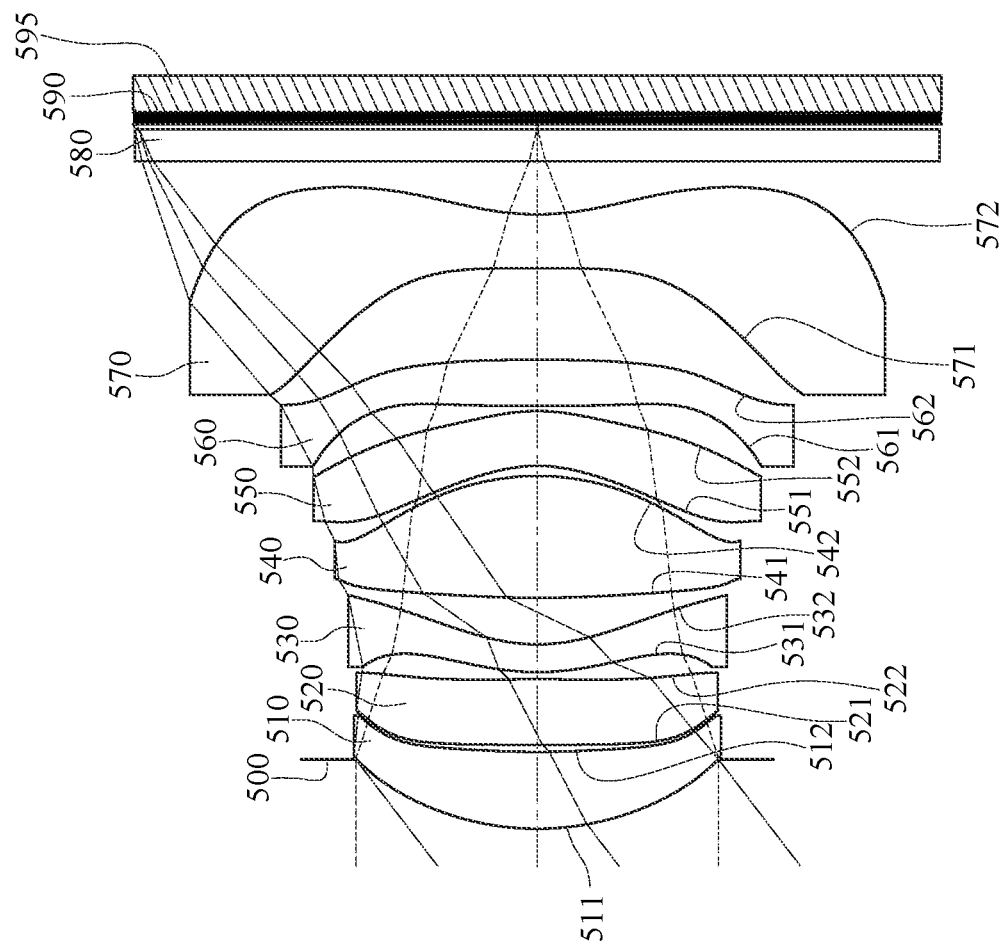
FIG. 9 is a schematic view of an image capturing unit according to the 5th embodiment of the present disclosure.
Figure 10:
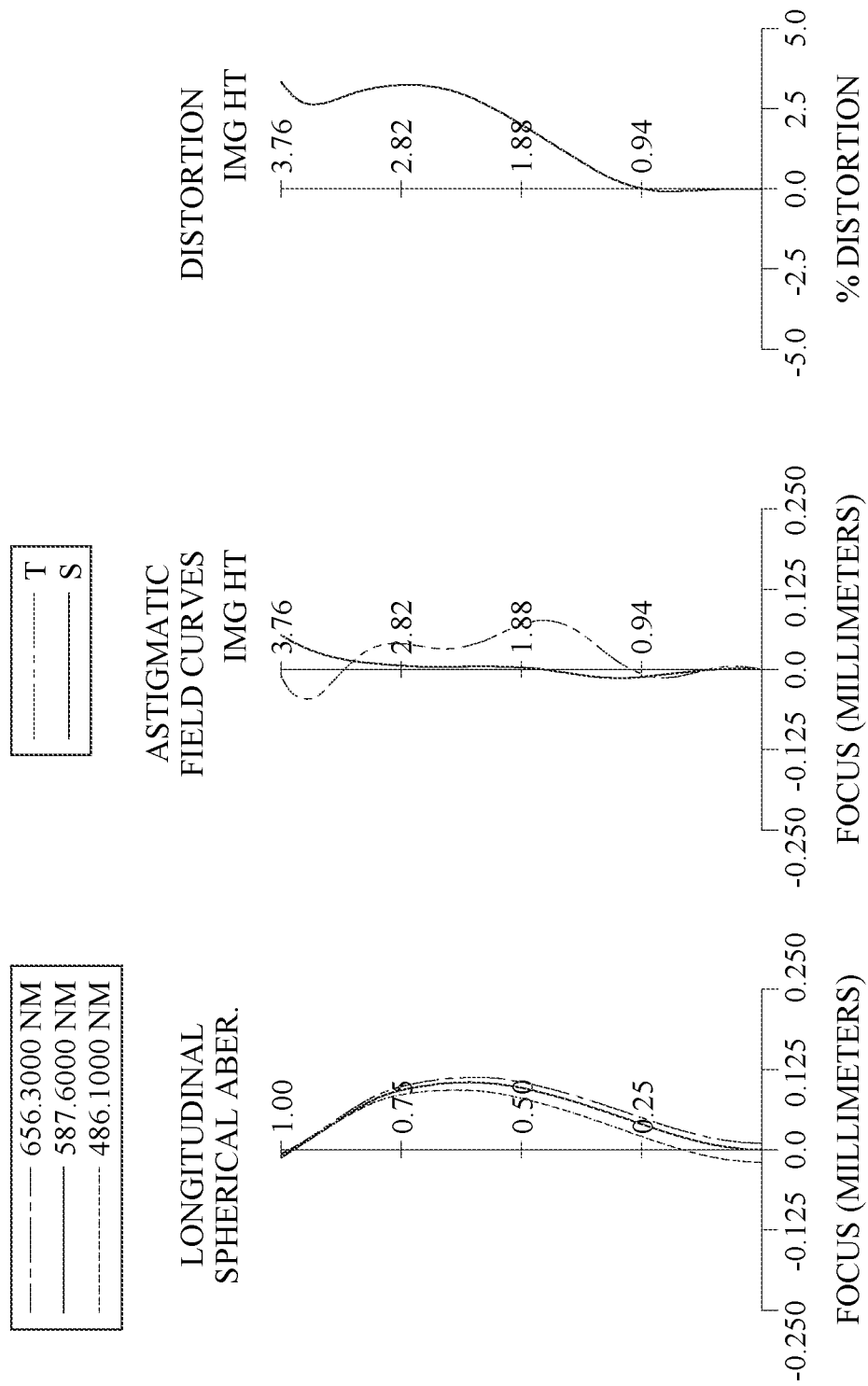
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 595. The photographing lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, a filter 580 and an image surface 590. The photographing lens assembly includes seven single and non-cemented lens elements (510, 520, 530, 540, 550, 560 and 570) with no additional lens element disposed between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has at least one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one inflection point.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. Both the object-side surface 561 and the image-side surface 562 of the sixth lens element 560 have at least one inflection point.

The seventh lens element 570 with negative refractive power has an object-side surface 571 being concave in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one convex shape in an off-axis region thereof.

The filter 580 is made of glass and located between the seventh lens element 570 and the image surface 590, and will not affect the focal length of the photographing lens assembly. The image sensor 595 is disposed on or near the image surface 590 of the photographing lens assembly.

The detailed optical data of the 5th embodiment are shown in Table 9 and the aspheric surface data are shown in Table 10 below.

TABLE 9

5th Embodiment
f = 4.72 mm, Fno = 1.39, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.648 | | | | |
| 2 | Lens 1 | 2.607 | (ASP) | 0.721 | Plastic | 1.544 | 56.0 | 6.71 |
| 3 | | 8.234 | (ASP) | 0.065 | | | | |
| 4 | Lens 2 | 34.695 | (ASP) | 0.616 | Plastic | 1.544 | 56.0 | 22.52 |
| 5 | | −18.821 | (ASP) | 0.067 | | | | |
| 6 | Lens 3 | 2.262 | (ASP) | 0.261 | Plastic | 1.639 | 23.5 | −10.70 |
| 7 | | 1.623 | (ASP) | 0.436 | | | | |
| 8 | Lens 4 | 9.397 | (ASP) | 1.143 | Plastic | 1.544 | 56.0 | 3.47 |
| 9 | | −2.258 | (ASP) | 0.094 | | | | |
| 10 | Lens 5 | −1.389 | (ASP) | 0.514 | Plastic | 1.607 | 26.6 | −45.25 |
| 11 | | −1.668 | (ASP) | 0.051 | | | | |
| 12 | Lens 6 | −35.650 | (ASP) | 0.428 | Plastic | 1.582 | 30.2 | −146.55 |
| 13 | | −61.488 | (ASP) | 0.861 | | | | |
| 14 | Lens 7 | −36.630 | (ASP) | 0.503 | Plastic | 1.544 | 56.0 | −4.08 |
| 15 | | 2.376 | (ASP) | 0.500 | | | | |
| 16 | Filter | Plano | | 0.300 | Glass | 1.517 | 64.2 | — |

TABLE 9-continued

5th Embodiment
f = 4.72 mm, Fno = 1.39, HFOV = 38.5 deg.

| Surface # | | Curvature Radius | Thickness | Material | Index | Abbe # | Focal Length |
|---|---|---|---|---|---|---|---|
| 17 | | Plano | 0.048 | | | | |
| 18 | Image | Plano | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | −1.6384E+00 | −1.7399E+01 | 1.5128E+01 | 1.1614E+00 | −1.0879E+00 |
| A4 = | 1.0758E−02 | −2.2661E−02 | −2.9570E−03 | 5.4565E−02 | −8.4433E−02 |
| A6 = | −2.5437E−03 | 1.2094E−02 | 7.9975E−03 | −3.2675E−02 | 3.8438E−02 |
| A8 = | 4.8814E−03 | −1.9748E−04 | −1.3335E−02 | 2.4892E−02 | −4.2292E−02 |
| A10 = | −3.7869E−03 | 3.7308E−04 | 4.1154E−03 | −1.7278E−02 | 2.7034E−02 |
| A12 = | 1.7132E−03 | 2.5870E−03 | −2.8463E−04 | 7.4458E−03 | −1.0838E−02 |
| A14 = | −3.5681E−04 | −1.4227E−03 | −5.9484E−04 | −1.7498E−03 | 2.4539E−03 |
| A16 = | 2.6951E−05 | 1.9140E−04 | 1.1365E−04 | 1.7086E−04 | −2.4409E−04 |

| Surface # | 7 | 8 | 9 | 10 | 11 |
|---|---|---|---|---|---|
| k = | −3.0017E+00 | −9.5000E+01 | −2.4993E+00 | −1.2490E+00 | −6.1923E+00 |
| A4 = | −5.7272E−02 | −1.0522E−02 | 7.0982E−03 | 1.5689E−01 | 1.1164E−01 |
| A6 = | 4.9731E−02 | 1.2956E−02 | −4.3692E−02 | −1.0933E−01 | −8.3736E−02 |
| A8 = | −4.4574E−02 | −1.0492E−02 | 3.3344E−02 | 4.7596E−02 | 2.5985E−02 |
| A10 = | 2.5476E−02 | 6.8579E−03 | −1.2549E−02 | −1.0798E−02 | −3.4301E−03 |
| A12 = | −8.7697E−03 | −3.0973E−03 | 2.8254E−03 | 1.1890E−03 | −4.7911E−05 |
| A14 = | 1.6805E−03 | 7.6928E−04 | −3.6801E−04 | −2.6661E−05 | 5.7103E−05 |
| A16 = | −1.3637E−04 | −7.3164E−05 | 2.5315E−05 | −4.6273E−06 | −3.9323E−06 |

| Surface # | 12 | 13 | 14 | 15 |
|---|---|---|---|---|
| k = | 7.8231E+00 | −4.8941E+01 | 8.8179E+01 | −9.3323E−01 |
| A4 = | 8.1195E−02 | −7.0615E−02 | −3.1504E+00 | −1.0551E+01 |
| A6 = | −8.2991E−02 | 7.2342E−02 | −4.0100E+01 | 7.9817E+01 |
| A8 = | 4.7525E−02 | −4.5493E−02 | 2.3673E+02 | 6.3233E+01 |
| A10 = | −2.3678E−02 | 1.4238E−02 | −6.0975E+02 | −2.5170E+02 |
| A12 = | 7.5248E−03 | −2.2930E−03 | 8.4235E+02 | 4.0424E+02 |
| A14 = | −1.2480E−03 | 1.8451E−04 | −5.9883E+02 | −3.1385E+02 |
| A16 = | 8.1700E−05 | −5.8817E−06 | 1.7415E+02 | 9.4942E+01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.72 | (R3 + R4)/(R3 − R4) | 0.30 |
| Fno | 1.39 | (R8 + R9)/(R8 − R9) | 4.20 |
| HFOV [deg.] | 38.5 | (R13 + R14)/(R13 − R14) | 0.88 |
| V5 | 26.6 | \|f/R11\| + \|f/R12\| | 0.21 |
| \|V1 − V4\| | 0.0 | f/EPD | 1.39 |
| V3 + V5 + V6 | 80.4 | f/f1 | 0.70 |
| Vmin | 23.5 | \|f7/f1\| | 0.61 |
| T34/T56 | 8.55 | \|f2/f6\| | 0.15 |
| ATmax/ATmin | 16.90 | $(TL)^2$/(EPD × ImgH) | 3.42 |
| TL/T67 | 7.67 | BL/EPD | 0.25 |
| TL/EPD | 1.94 | TL/ImgH | 1.76 |
| \|TL/f6\| | 0.05 | \|Dsr5/Dsr6\| | 0.76 |

6th Embodiment

Figure 11:
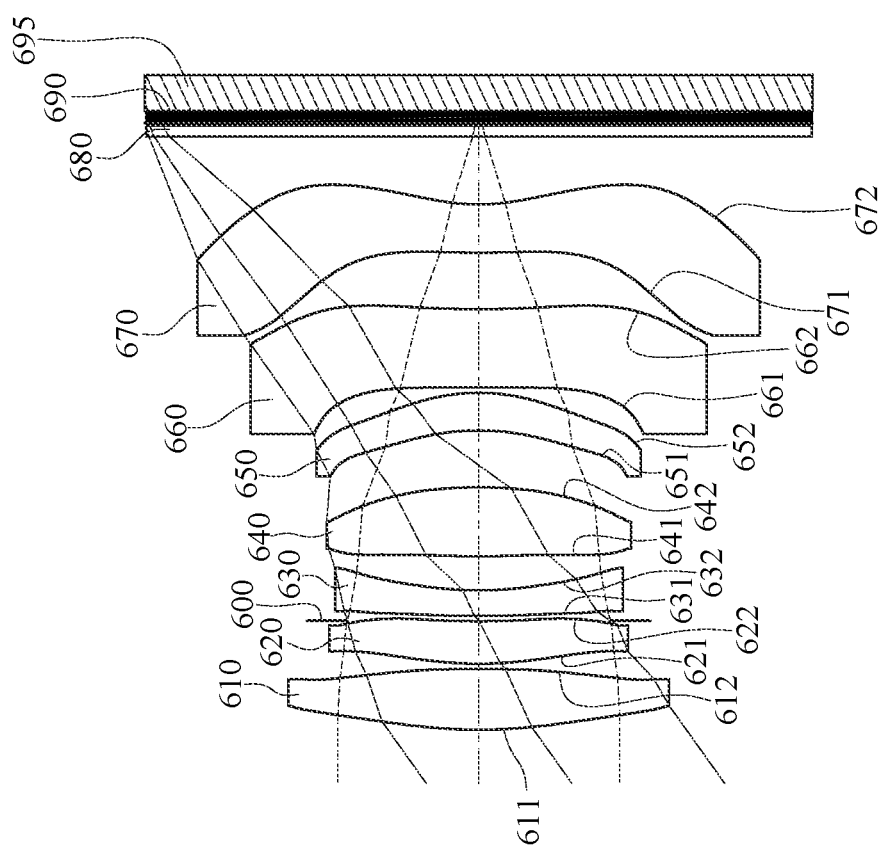
FIG. 11 is a schematic view of an image capturing unit according to the 6th embodiment of the present disclosure.
Figure 12:
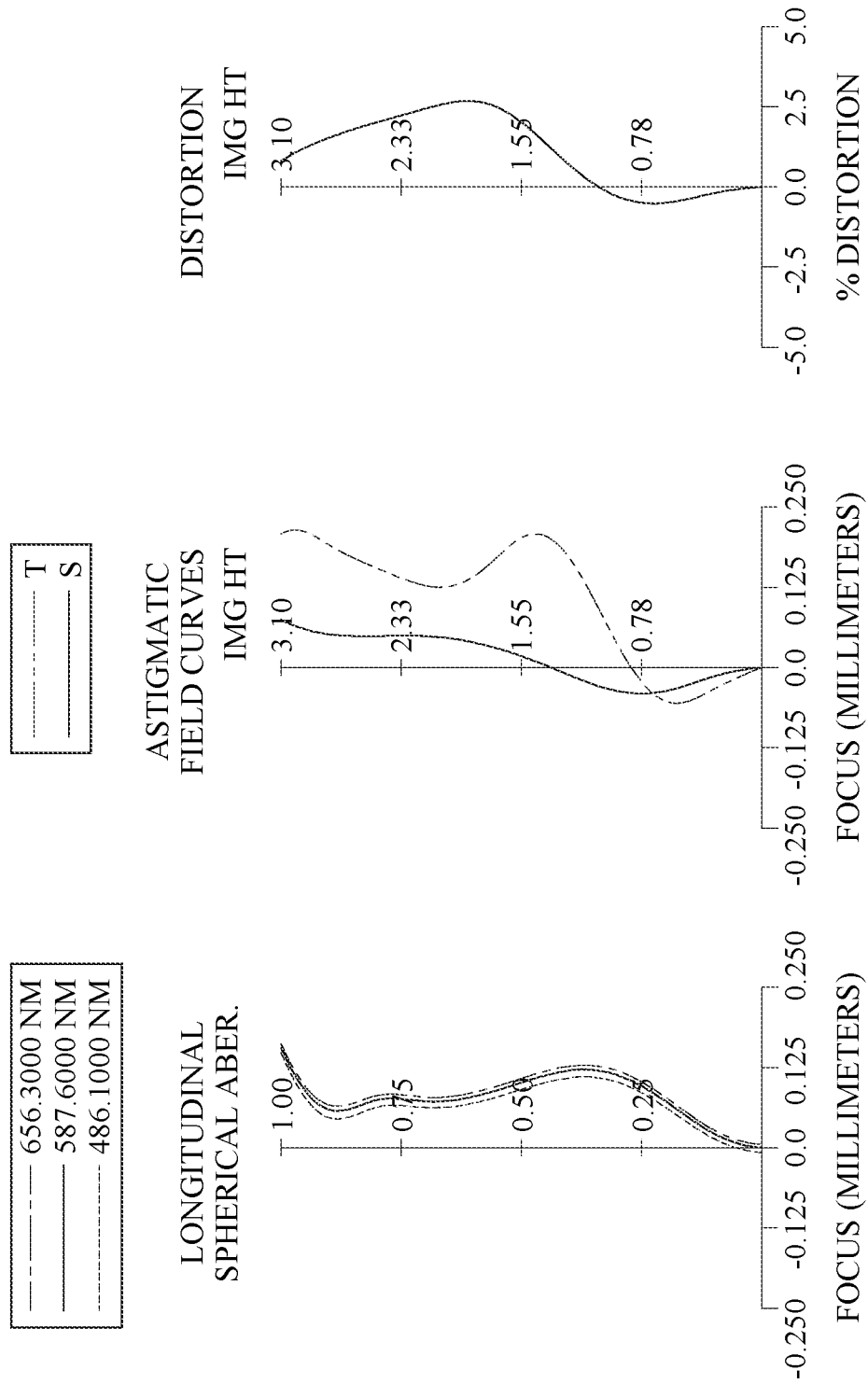
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 695. The photographing lens assembly includes, in order from an object side to an image side, a first lens element 610, a second lens element 620, an aperture stop 600, a third lens element 630, a fourth lens element 640, a fifth lens element 650, a sixth lens element 660, a seventh lens element 670, a filter 680 and an image surface 690. The photographing lens assembly includes seven single and non-cemented lens elements (610, 620, 630, 640, 650, 660 and 670) with no additional lens element disposed between the first lens element 610 and the seventh lens element 670.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. Both the object-side surface 661 and the image-side surface 662 of the sixth lens element 660 have at least one inflection point.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one convex shape in an off-axis region thereof.

The filter 680 is made of glass and located between the seventh lens element 670 and the image surface 690, and will not affect the focal length of the photographing lens assembly. The image sensor 695 is disposed on or near the image surface 690 of the photographing lens assembly.

The detailed optical data of the 6th embodiment are shown in Table 11 and the aspheric surface data are shown in Table 12 below.

TABLE 11

6th Embodiment
f = 4.25 mm, Fno = 1.61, HFOV = 35.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.514 | (ASP) | 0.569 | Plastic | 1.544 | 56.0 | 7.13 |
| 2 | | −26.327 | (ASP) | 0.050 | | | | |
| 3 | Lens 2 | 3.176 | (ASP) | 0.397 | Plastic | 1.544 | 56.0 | 9.44 |
| 4 | | 7.958 | (ASP) | 0.006 | | | | |
| 5 | Ape. Stop | Plano | | 0.044 | | | | |
| 6 | Lens 3 | 9.674 | (ASP) | 0.240 | Plastic | 1.639 | 23.5 | −6.94 |
| 7 | | 3.009 | (ASP) | 0.320 | | | | |
| 8 | Lens 4 | 7.852 | (ASP) | 0.646 | Plastic | 1.544 | 56.0 | 5.15 |
| 9 | | −4.234 | (ASP) | 0.533 | | | | |
| 10 | Lens 5 | −2.272 | (ASP) | 0.353 | Plastic | 1.544 | 56.0 | 16.25 |
| 11 | | −1.906 | (ASP) | 0.050 | | | | |
| 12 | Lens 6 | 3905.428 | (ASP) | 0.734 | Plastic | 1.607 | 26.6 | −15.01 |
| 13 | | 9.091 | (ASP) | 0.529 | | | | |
| 14 | Lens 7 | 6.752 | (ASP) | 0.453 | Plastic | 1.534 | 55.9 | −4.91 |
| 15 | | 1.844 | (ASP) | 0.640 | | | | |
| 16 | Filter | Plano | | 0.100 | Glass | 1.517 | 64.2 | — |
| 17 | | Plano | | 0.025 | | | | |
| 18 | Image | Plano | | — | | | | |

Note:
Reference wavelength is 587.6 nm (d-line).

TABLE 12

Aspheric Coefficients

| Surface # | 1 | 2 | 3 | 4 | 6 |
|---|---|---|---|---|---|
| k = | −3.8854E+00 | 9.0000E+01 | −7.6094E+00 | −7.8564E−01 | −8.7982E+01 |
| A4 = | −2.1748E−02 | −1.0933E−01 | −1.0318E−01 | 8.3929E−02 | 6.3915E−02 |
| A6 = | 1.0730E−02 | 1.6978E−01 | 2.2051E−01 | −4.5473E−01 | −4.3891E−01 |
| A8 = | −1.4245E−02 | −1.6436E−01 | −3.4378E−01 | 6.9575E−01 | 9.3956E−01 |
| A10 = | 1.2714E−02 | 1.0465E−01 | 3.3541E−01 | −6.1573E−01 | −1.0433E+00 |
| A12 = | −5.7902E−03 | −4.0946E−02 | −2.0591E−01 | 3.2188E−01 | 6.5633E−01 |
| A14 = | 1.2872E−03 | 8.8021E−03 | 7.0741E−02 | −9.0247E−02 | −2.1813E−01 |
| A16 = | −1.0895E−04 | −7.8174E−04 | −1.0159E−02 | 1.0196E−02 | 2.8908E−02 |

TABLE 12-continued

| Aspheric Coefficients | | | | | |
|---|---|---|---|---|---|
| Surface # | 7 | 8 | 9 | 10 | 11 |
| k = | −1.7648E+01 | −8.1962E+01 | 1.8803E−01 | 1.4515E+00 | −9.8410E+00 |
| A4 = | −8.0803E−03 | −7.7111E−02 | 3.2031E−03 | 1.0418E−02 | −2.6367E−01 |
| A6 = | −1.0559E−01 | 1.0022E−01 | −1.2474E−01 | 6.2512E−02 | 5.8779E−01 |
| A8 = | 3.5414E−01 | −1.7982E−01 | 2.1473E−01 | 5.0721E−02 | −7.7687E−01 |
| A10 = | −4.4742E−01 | 2.2472E−01 | −1.8615E−01 | −1.2173E−01 | 6.3038E−01 |
| A12 = | 2.9474E−01 | −1.5047E−01 | 9.1298E−02 | 9.6527E−02 | −2.9215E−01 |
| A14 = | −9.8640E−02 | 5.2999E−02 | −2.5508E−02 | −3.7559E−02 | 6.9135E−02 |
| A16 = | 1.2777E−02 | −7.7048E−03 | 3.3129E−03 | 5.4983E−03 | −6.4876E−03 |

| Surface # | 12 | 13 | 14 | 15 |
|---|---|---|---|---|
| k = | −3.0608E+01 | −8.9576E+01 | −2.0862E+00 | −2.8609E+00 |
| A4 = | −1.9070E−02 | 9.7011E−03 | −1.5706E−01 | −1.3931E−01 |
| A6 = | −2.2474E−02 | −2.6203E−02 | 8.2825E−02 | 7.3726E−02 |
| A8 = | 1.9164E−02 | 4.0485E−03 | −4.8481E−02 | −2.7415E−02 |
| A10 = | −3.8989E−02 | 2.5030E−03 | 1.6019E−02 | 5.8690E−03 |
| A12 = | 3.2939E−02 | −1.3523E−03 | −2.5778E−03 | −7.0862E−04 |
| A14 = | −1.1657E−02 | 2.6076E−04 | 1.9134E−04 | 4.5283E−05 |
| A16 = | 1.3543E−03 | −1.8230E−05 | −5.1446E−06 | −1.2000E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.25 | (R3 + R4)/(R3 − R4) | −2.33 |
| Fno | 1.61 | (R8 + R9)/(R8 − R9) | 3.32 |
| HFOV [deg.] | 35.5 | (R13 + R14)/(R13 − R14) | 1.75 |
| V5 | 56.0 | |f/R11| + |f/R12| | 0.47 |
| |V1 − V4| | 0.0 | f/EPD | 1.61 |
| V3 + V5 + V6 | 106.1 | f/f1 | 0.60 |
| Vmin | 23.5 | |f7/f1| | 0.69 |
| T34/T56 | 6.40 | |f2/f6| | 0.63 |
| ATmax/ATmin | 10.67 | (TL)$^2$/(EPD × ImgH) | 3.96 |
| TL/T67 | 10.75 | BL/EPD | 0.29 |
| TL/EPD | 2.16 | TL/ImgH | 1.84 |
| |TL/f6| | 0.38 | |Dsr5/Dsr6| | 0.15 |

7th Embodiment

Figure 13:
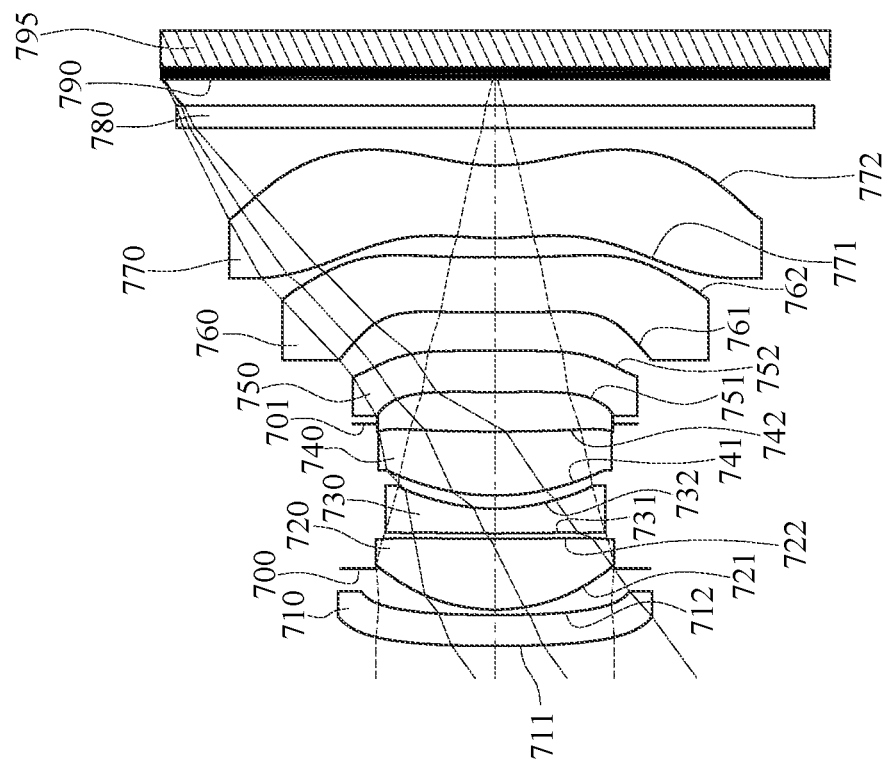
FIG. 13 is a schematic view of an image capturing unit according to the 7th embodiment of the present disclosure.
Figure 14:
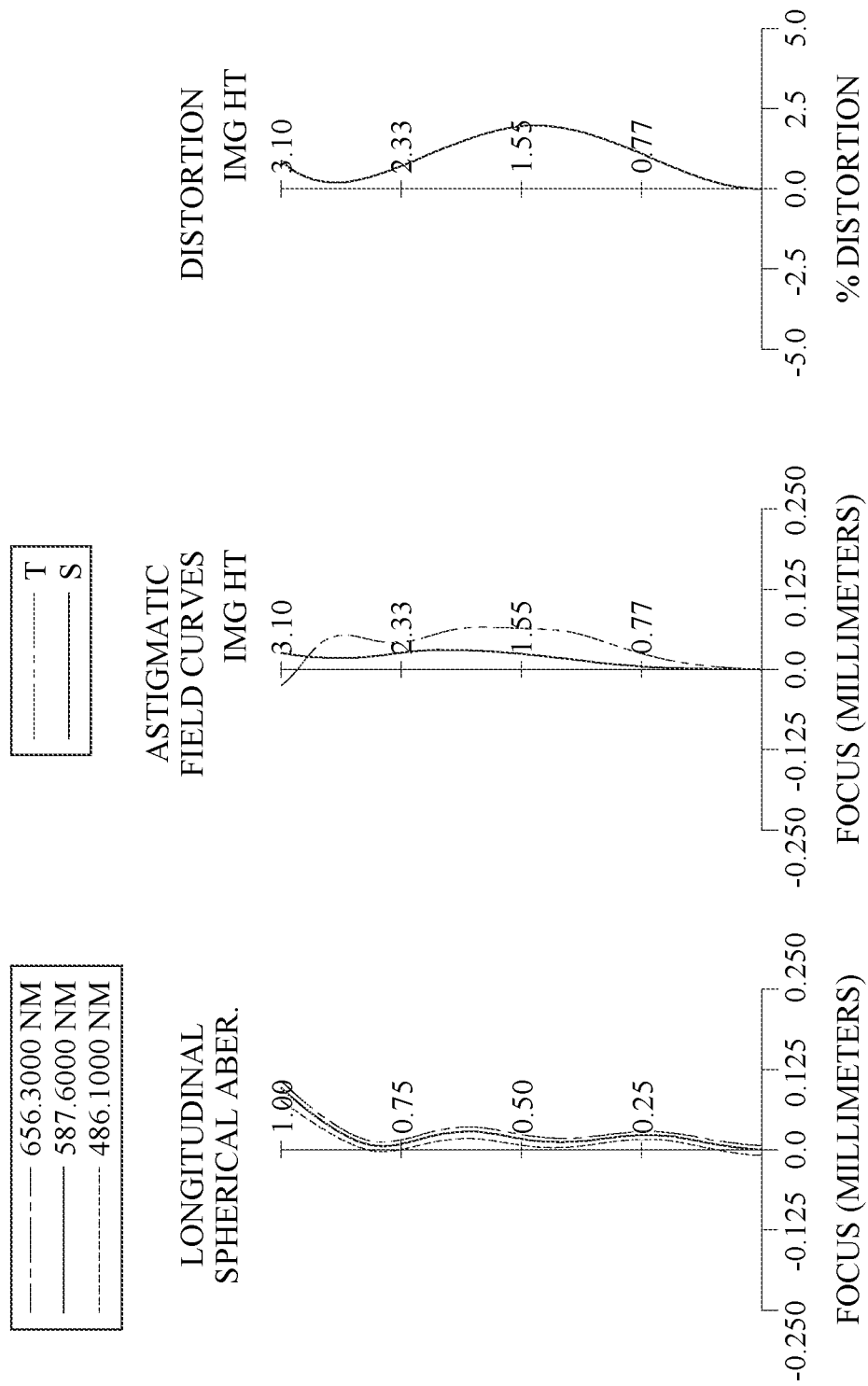
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 795. The photographing lens assembly includes, in order from an object side to an image side, a first lens element 710, an aperture stop 700, a second lens element 720, a third lens element 730, a fourth lens element 740, a stop 701, a fifth lens element 750, a sixth lens element 760, a seventh lens element 770, a filter 780 and an image surface 790. The photographing lens assembly includes seven single and non-cemented lens elements (710, 720, 730, 740, 750, 760 and 770) with no additional lens element disposed between the first lens element 710 and the seventh lens element 770.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one inflection point.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. Both the object-side surface 761 and the image-side surface 762 of the sixth lens element 760 have at least one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one convex shape in an off-axis region thereof.

The filter 780 is made of glass and located between the seventh lens element 770 and the image surface 790, and will not affect the focal length of the photographing lens assembly. The image sensor 795 is disposed on or near the image surface 790 of the photographing lens assembly.

The detailed optical data of the 7th embodiment are shown in Table 13 and the aspheric surface data are shown in Table 14 below.

TABLE 13

7th Embodiment
f = 4.19 mm, Fno = 1.88, HFOV = 36.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.537 | (ASP) | 0.291 | Plastic | 1.545 | 56.0 | −76.20 |
| 2 | | 8.947 | (ASP) | 0.437 | | | | |
| 3 | Ape. Stop | Plano | | −0.387 | | | | |
| 4 | Lens 2 | 1.622 | (ASP) | 0.665 | Plastic | 1.566 | 37.4 | 2.88 |
| 5 | | 260.011 | (ASP) | 0.050 | | | | |
| 6 | Lens 3 | 14.917 | (ASP) | 0.230 | Plastic | 1.660 | 20.4 | −2.98 |
| 7 | | 1.729 | (ASP) | 0.124 | | | | |
| 8 | Lens 4 | 2.222 | (ASP) | 0.599 | Plastic | 1.566 | 37.4 | 4.44 |
| 9 | | 17.252 | (ASP) | 0.071 | | | | |
| 10 | Stop | Plano | | 0.300 | | | | |
| 11 | Lens 5 | 29.249 | (ASP) | 0.387 | Plastic | 1.639 | 23.5 | 31.42 |
| 12 | | −63.549 | (ASP) | 0.362 | | | | |
| 13 | Lens 6 | −46.900 | (ASP) | 0.512 | Plastic | 1.634 | 23.8 | −20.18 |
| 14 | | 17.670 | (ASP) | 0.182 | | | | |
| 15 | Lens 7 | 3.286 | (ASP) | 0.681 | Plastic | 1.544 | 55.9 | −7.41 |
| 16 | | 1.678 | (ASP) | 0.350 | | | | |
| 17 | Filter | Plano | | 0.210 | Glass | 1.517 | 64.2 | — |
| 18 | | Plano | | 0.250 | | | | |
| 19 | Image | Plano | | — | | | | |

Note:
Reference wavelength is 587.6 nm (d-line).
An effective radius of the stop 701 (Surface 10) is 1.100 mm.

TABLE 14

Aspheric Coefficients

| Surface # | 1 | 2 | 4 | 5 | 6 |
|---|---|---|---|---|---|
| k = | −5.4866E+01 | −2.0890E+01 | −7.8406E−01 | −9.0000E+01 | 4.1909E+01 |
| A4 = | −2.4378E−02 | −1.7928E−01 | −1.7508E−01 | −6.7414E−02 | −1.3254E−01 |
| A6 = | 1.2470E−01 | 7.9542E−01 | 8.9370E−01 | 8.0173E−01 | 7.3131E−01 |
| A8 = | −1.5936E−01 | −1.3774E+00 | −1.8971E+00 | −2.5664E+00 | −2.4754E+00 |
| A10 = | 1.1199E−01 | 1.2328E+00 | 2.3010E+00 | 3.8900E+00 | 4.2503E+00 |
| A12 = | −3.9711E−02 | −5.2662E−01 | −1.6435E+00 | −3.1287E+00 | −3.8105E+00 |
| A14 = | 5.7170E−03 | 6.5351E−02 | 6.4476E−01 | 1.2745E+00 | 1.7185E+00 |
| A16 = | 7.4063E−05 | 1.2305E−02 | −1.0766E−01 | −2.0565E−01 | −3.0879E−01 |

| Surface # | 7 | 8 | 9 | 11 | 12 |
|---|---|---|---|---|---|
| k = | −2.5024E+00 | 1.9960E+00 | −2.5690E+01 | −9.9585E−01 | −9.9633E−01 |
| A4 = | −5.9227E−02 | −3.9041E−03 | 1.3784E−02 | −1.7366E−02 | 6.1846E−02 |
| A6 = | 1.1840E−01 | −9.3004E−02 | −3.9756E−02 | −3.6315E−01 | −4.9113E−01 |
| A8 = | −5.8587E−01 | 6.2376E−02 | 1.7173E−01 | 7.3897E−01 | 8.0144E−01 |
| A10 = | 1.5888E+00 | 5.1006E−02 | −3.9144E−01 | −7.8264E−01 | −7.9205E−01 |
| A12 = | −1.9011E+00 | −1.4568E−01 | 4.2027E−01 | 2.3786E−01 | 4.5045E−01 |
| A14 = | 1.0964E+00 | 1.1622E−01 | −2.3030E−01 | 1.7441E−01 | −1.2968E−01 |
| A16 = | −2.5172E−01 | −3.5882E−02 | 4.7429E−02 | −1.1396E−01 | 1.4551E−02 |

| Surface # | 13 | 14 | 15 | 16 |
|---|---|---|---|---|
| k = | −4.9995E+01 | 1.7203E+01 | −4.1519E+00 | −5.3519E+00 |
| A4 = | 8.5144E−01 | 4.3349E−02 | −3.0040E−01 | −1.3722E−01 |
| A6 = | −4.7046E+00 | −7.6235E−02 | 1.8426E−01 | 7.2675E−02 |
| A8 = | 1.1007E+01 | 3.2052E−02 | −7.2992E−02 | −3.1117E−02 |
| A10 = | −1.8871E+01 | −9.9317E−03 | 1.9827E−02 | 8.5753E−03 |
| A12 = | 1.8865E+01 | 2.6446E−03 | −3.3750E−03 | −1.4045E−03 |
| A14 = | −9.4459E+00 | −4.2032E−04 | 3.1657E−04 | 1.2274E−04 |
| A16 = | 1.8588E+00 | 2.5666E−05 | −1.2366E−05 | −4.3287E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.19 | (R3 + R4)/(R3 − R4) | −1.01 |
| Fno | 1.88 | (R8 + R9)/(R8 − R9) | −3.88 |
| HFOV [deg.] | 36.1 | (R13 + R14)/(R13 − R14) | 3.09 |
| V5 | 23.5 | \|f/R11\| + \|f/R12\| | 0.33 |
| \|V1 − V4\| | 18.6 | f/EPD | 1.88 |
| V3 + V5 + V6 | 67.7 | f/f1 | −0.06 |
| Vmin | 20.4 | \|f7/f1\| | 0.10 |
| T34/T56 | 0.34 | \|f2/f6\| | 0.14 |
| ATmax/ATmin | 7.42 | (TL)$^2$/(EPD × ImgH) | 4.08 |
| TL/T67 | 29.15 | BL/EPD | 0.36 |
| TL/EPD | 2.38 | TL/ImgH | 1.71 |
| \|TL/f6\| | 0.26 | \|Dsr5/Dsr6\| | 0.59 |

8th Embodiment

Figure 15:
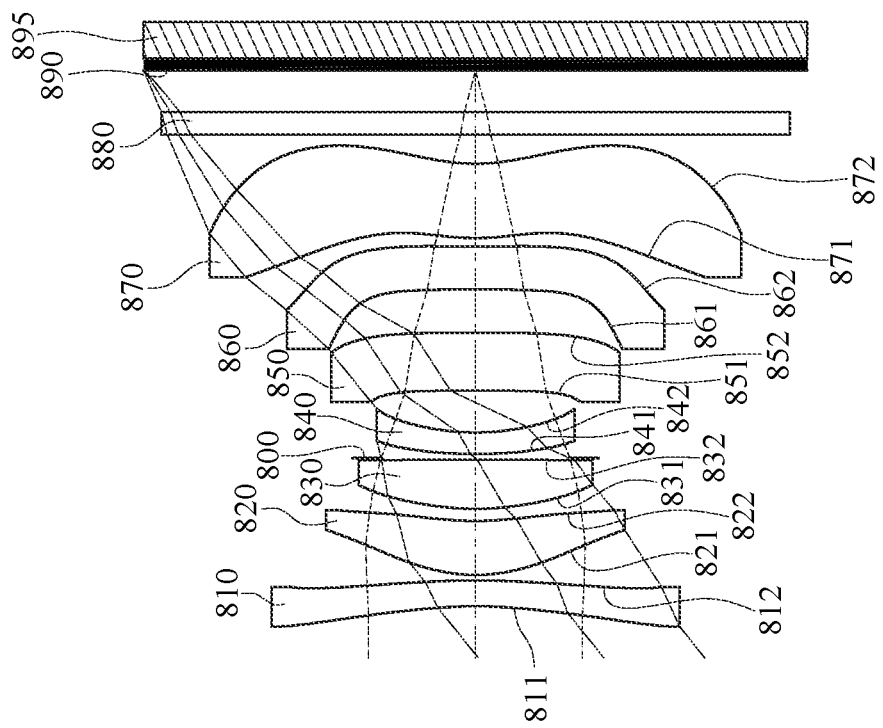
FIG. 15 is a schematic view of an image capturing unit according to the 8th embodiment of the present disclosure.
Figure 16:
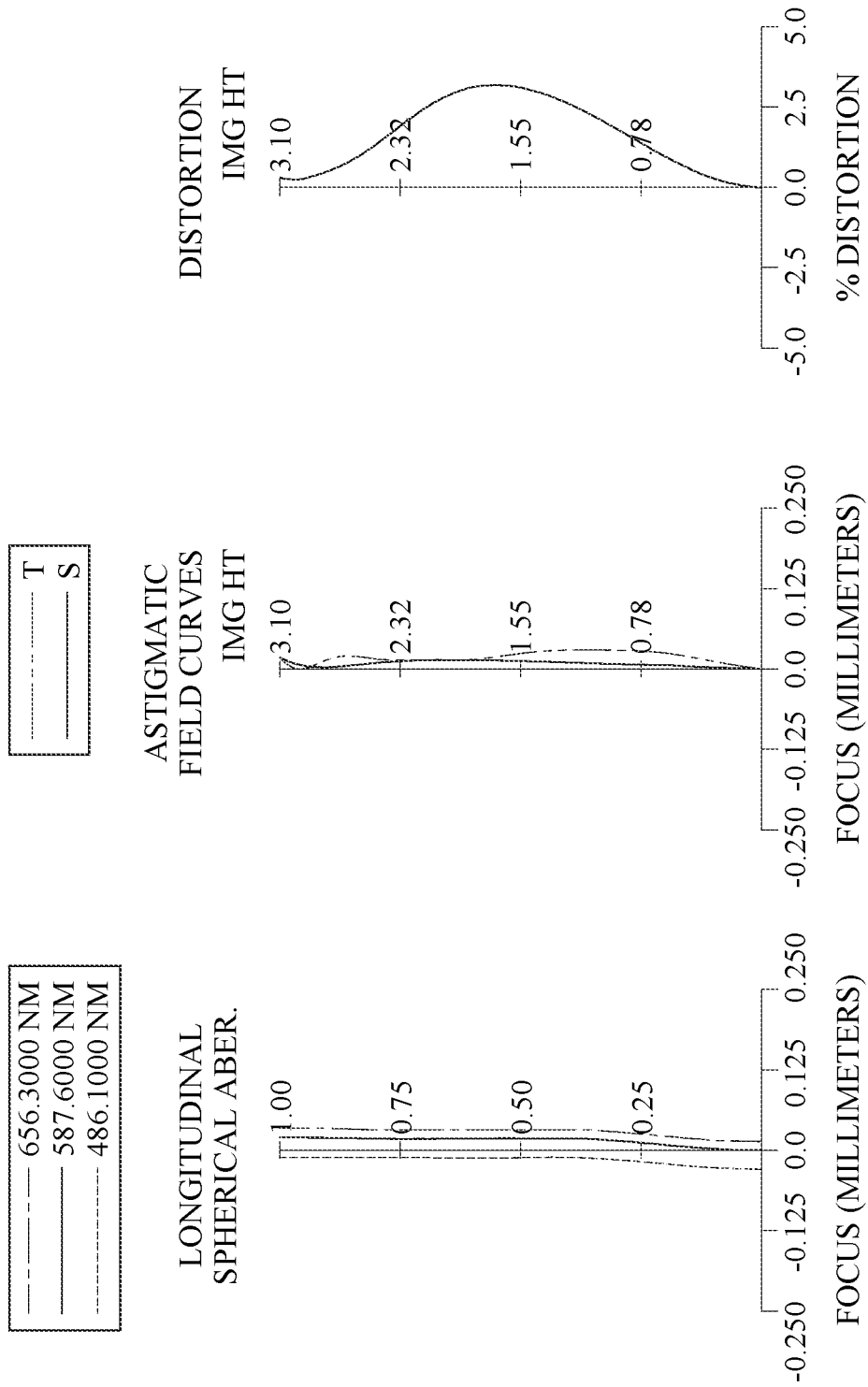
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 895. The photographing lens assembly includes, in order from an object side to an image side, a first lens element 810, a second lens element 820, a third lens element 830, an aperture stop 800, a fourth lens element 840, a fifth lens element 850, a sixth lens element 860, a seventh lens element 870, a filter 880 and an image surface 890. The photographing lens assembly includes seven single and non-cemented lens elements (810, 820, 830, 840, 850, 860 and 870) with no additional lens element disposed between the first lens element 810 and the seventh lens element 870.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has at least one inflection point.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. Both the object-side surface 861 and the image-side surface 862 of the sixth lens element 860 have at least one inflection point.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has at least one convex shape in an off-axis region thereof.

The filter 880 is made of glass and located between the seventh lens element 870 and the image surface 890, and will not affect the focal length of the photographing lens assembly. The image sensor 895 is disposed on or near the image surface 890 of the photographing lens assembly.

The detailed optical data of the 8th embodiment are shown in Table 15 and the aspheric surface data are shown in Table 16 below.

TABLE 15

8th Embodiment
f = 3.81 mm, Fno = 1.90, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.164 | (ASP) | 0.242 | Plastic | 1.545 | 56.1 | −16.93 |
| 2 | | −7.744 | (ASP) | 0.053 | | | | |
| 3 | Lens 2 | 1.555 | (ASP) | 0.506 | Plastic | 1.544 | 56.0 | 5.26 |
| 4 | | 3.016 | (ASP) | 0.113 | | | | |
| 5 | Lens 3 | 2.539 | (ASP) | 0.464 | Plastic | 1.544 | 56.0 | 4.16 |
| 6 | | −19.608 | (ASP) | 0.012 | | | | |
| 7 | Ape. Stop | Plano | | 0.038 | | | | |
| 8 | Lens 4 | 4.267 | (ASP) | 0.202 | Plastic | 1.544 | 56.0 | −8.56 |

TABLE 15-continued

8th Embodiment
f = 3.81 mm, Fno = 1.90, HFOV = 38.9 deg.

| Surface # | | Curvature Radius | | Thickness | Material | Index | Abbe # | Focal Length |
|---|---|---|---|---|---|---|---|---|
| 9 | | 2.190 | (ASP) | 0.391 | | | | |
| 10 | Lens 5 | 87.772 | (ASP) | 0.542 | Plastic | 1.671 | 19.3 | 312.07 |
| 11 | | 150.759 | (ASP) | 0.408 | | | | |
| 12 | Lens 6 | −21.586 | (ASP) | 0.400 | Plastic | 1.671 | 19.3 | −8.60 |
| 13 | | 7.927 | (ASP) | 0.081 | | | | |
| 14 | Lens 7 | 1.907 | (ASP) | 0.698 | Plastic | 1.534 | 55.9 | 63.05 |
| 15 | | 1.764 | (ASP) | 0.276 | | | | |
| 16 | Filter | Plano | | 0.210 | Glass | 1.517 | 64.2 | — |
| 17 | | Plano | | 0.390 | | | | |
| 18 | Image | Plano | | — | | | | |

Note:
Reference wavelength is 587.6 nm (d-line).

TABLE 16

Aspheric Coefficients

| Surface # | 1 | 2 | 3 | 4 | 5 |
|---|---|---|---|---|---|
| k = | −4.9465E+01 | −4.9775E+01 | −7.5008E−01 | −1.6080E+00 | −1.7771E+00 |
| A4 = | −2.5669E−03 | 1.0416E−02 | −7.8402E−02 | −1.0444E−01 | −4.3752E−02 |
| A6 = | −1.2204E−03 | −4.8617E−04 | 7.6671E−02 | −2.6269E−02 | 1.1485E−03 |
| A8 = | 2.6701E−04 | −6.6825E−03 | −1.1230E−01 | 8.0274E−02 | −2.5717E−02 |
| A10 = | 9.9853E−04 | 7.6522E−03 | 8.4376E−02 | −3.3295E−02 | 2.3274E−01 |
| A12 = | −6.5091E−04 | −3.7916E−03 | −4.3744E−02 | −1.2280E−02 | −3.0539E−01 |
| A14 = | 1.6139E−04 | 9.0413E−04 | 1.5422E−02 | 1.4637E−02 | 1.6552E−01 |
| A16 = | −1.4068E−05 | −8.1814E−05 | −2.4579E−03 | −3.4766E−03 | −3.4478E−02 |

| Surface # | 6 | 8 | 9 | 10 | 11 |
|---|---|---|---|---|---|
| k = | −8.5562E+01 | 5.5572E+00 | −1.5781E+01 | −9.0000E+01 | 2.0000E+01 |
| A4 = | 5.7431E−02 | −1.7219E−02 | 1.1347E−01 | −8.3762E−02 | −4.7496E−02 |
| A6 = | −1.5779E−01 | −2.7524E−03 | −9.6221E−02 | 1.0406E−01 | −5.7066E−03 |
| A8 = | 4.5037E−01 | 2.5642E−01 | 1.4870E−01 | −4.7164E−01 | 2.0023E−02 |
| A10 = | −8.7150E−01 | −5.8690E−01 | 1.3410E−02 | 1.1544E+00 | −3.3665E−02 |
| A12 = | 9.8071E−01 | 5.7979E−01 | −2.3470E−01 | −1.8078E+00 | 2.4103E−02 |
| A14 = | −5.9689E−01 | −1.9788E−01 | 2.0553E−01 | 1.5427E+00 | −6.4357E−03 |
| A16 = | 1.5227E−01 | — | — | −5.6700E−01 | — |

| Surface # | 12 | 13 | 14 | 15 |
|---|---|---|---|---|
| k = | −1.0000E+00 | −3.3114E+00 | −1.6447E+01 | −4.9227E+00 |
| A4 = | 3.9093E−02 | −2.3376E−01 | −2.5463E−01 | −1.0500E−01 |
| A6 = | −6.2700E−01 | 3.2688E−01 | 1.6478E−01 | 4.0321E−02 |
| A8 = | 1.5176E+00 | −3.3069E−01 | −6.5431E−02 | −1.1371E−02 |
| A10 = | −3.5332E+00 | 1.9798E−01 | 1.6752E−02 | 1.8384E−03 |
| A12 = | 4.7565E+00 | −7.1625E−02 | −2.6361E−03 | −1.5686E−04 |
| A14 = | −3.5748E+00 | 1.4103E−02 | 2.2974E−04 | 4.9853E−06 |
| A16 = | 1.1005E+00 | −1.1305E−03 | −8.4540E−06 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.81 | (R3 + R4)/(R3 − R4) | −3.13 |
| Fno | 1.90 | (R8 + R9)/(R8 − R9) | −1.05 |
| HFOV [deg.] | 38.9 | (R13 + R14)/(R13 − R14) | 25.68 |
| V5 | 19.3 | |f/R11| + |f/R12| | 0.66 |
| |V1 − V4| | 0.1 | f/EPD | 1.90 |
| V3 + V5 + V6 | 94.6 | f/f1 | −0.22 |
| Vmin | 19.3 | |f7/f1| | 3.72 |
| T34/T56 | 0.12 | |f2/f6| | 0.61 |
| ATmax/ATmin | 8.16 | (TL)$^2$/(EPD × ImgH) | 4.07 |
| TL/T67 | 62.05 | BL/EPD | 0.44 |
| TL/EPD | 2.51 | TL/ImgH | 1.62 |
| |TL/f6| | 0.58 | |Dsr5/Dsr6| | 39.67 |

9th Embodiment

Figure 17:
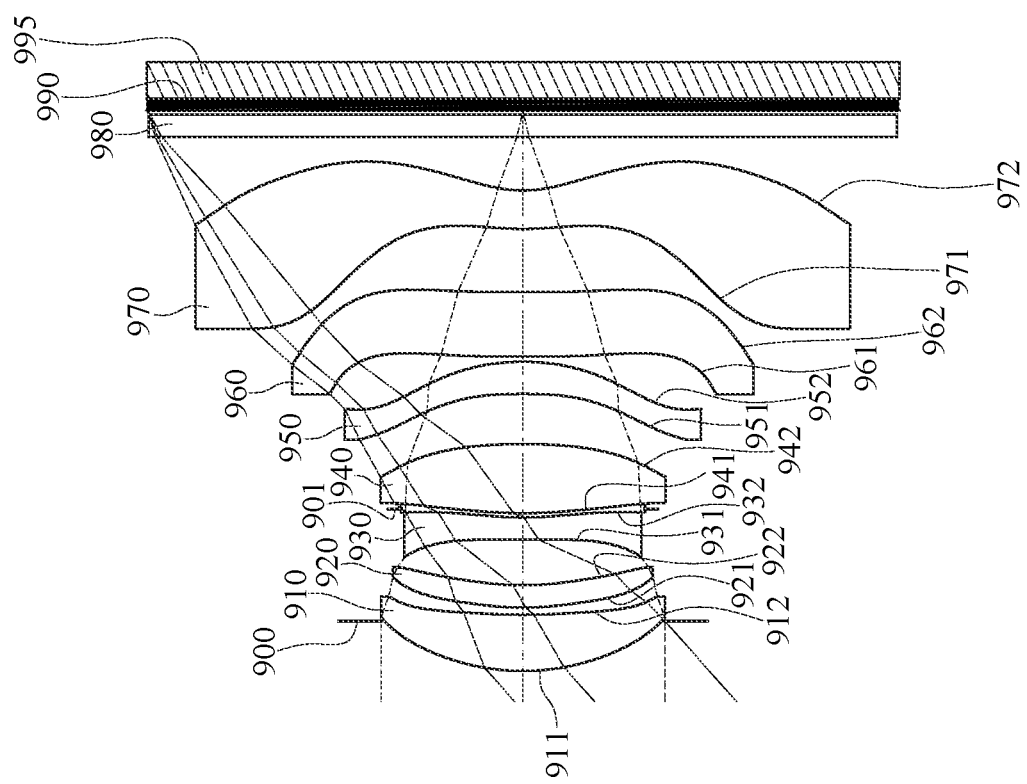
FIG. 17 is a schematic view of an image capturing unit according to the 9th embodiment of the present disclosure.
Figure 18:
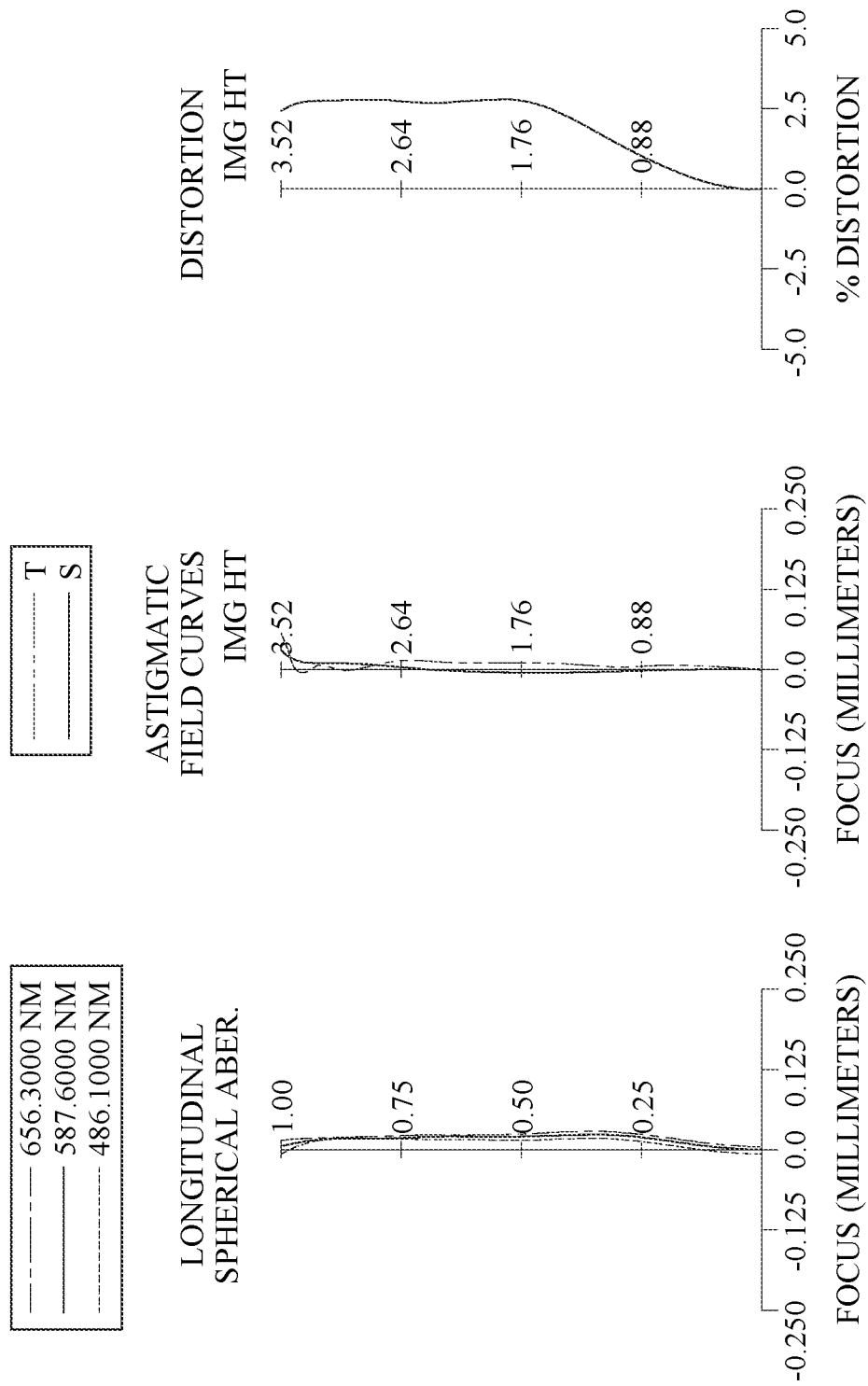
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 995. The photographing lens assembly includes, in order from an object side to an image side, an aperture stop 900, a first lens element 910, a second lens element 920, a third lens element 930, a stop 901, a fourth lens element 940, a fifth lens element 950, a sixth lens element 960, a seventh lens element 970, a filter 980 and an image surface 990. The photographing lens assembly includes seven single and non-cemented lens elements (910, 920, 930, 940, 950, 960 and 970) with no additional lens element disposed between the first lens element 910 and the seventh lens element 970.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The image-side surface 932 of the third lens element 930 has at least one inflection point.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one inflection point.

The sixth lens element 960 has an object-side surface 961 being planar in a paraxial region thereof and an image-side surface 962 being planar in a paraxial region thereof. The sixth lens element 960 is made of plastic material and has the object-side surface 961 and the image-side surface 962 being both aspheric. Both the object-side surface 961 and the image-side surface 962 of the sixth lens element 960 have at least one inflection point.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The image-side surface 972 of the seventh lens element 970 has at least one convex shape in an off-axis region thereof.

The filter 980 is made of glass and located between the seventh lens element 970 and the image surface 990, and will not affect the focal length of the photographing lens assembly. The image sensor 995 is disposed on or near the image surface 990 of the photographing lens assembly.

The detailed optical data of the 9th embodiment are shown in Table 17 and the aspheric surface data are shown in Table 18 below.

TABLE 17

9th Embodiment
f = 3.85 mm, Fno = 1.45, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.469 | | | | |
| 2 | Lens 1 | 2.157 | (ASP) | 0.526 | Plastic | 1.545 | 56.0 | 6.74 |
| 3 | | 4.780 | (ASP) | 0.067 | | | | |
| 4 | Lens 2 | 2.314 | (ASP) | 0.210 | Plastic | 1.566 | 37.4 | 32.25 |
| 5 | | 2.563 | (ASP) | 0.426 | | | | |
| 6 | Lens 3 | 12.252 | (ASP) | 0.210 | Plastic | 1.660 | 20.4 | −5.74 |
| 7 | | 2.875 | (ASP) | 0.080 | | | | |
| 8 | Stop | Plano | | −0.040 | | | | |
| 9 | Lens 4 | 3.754 | (ASP) | 0.648 | Plastic | 1.544 | 55.9 | 4.30 |
| 10 | | −5.810 | (ASP) | 0.471 | | | | |
| 11 | Lens 5 | −4.840 | (ASP) | 0.300 | Plastic | 1.566 | 37.4 | 6.92 |
| 12 | | −2.214 | (ASP) | 0.050 | | | | |
| 13 | Lens 6 | ∞ | (ASP) | 0.605 | Plastic | 1.660 | 20.4 | Infinity |
| 14 | | ∞ | (ASP) | 0.592 | | | | |
| 15 | Lens 7 | 2.897 | (ASP) | 0.360 | Plastic | 1.566 | 37.4 | −3.62 |
| 16 | | 1.146 | (ASP) | 0.500 | | | | |
| 17 | Filter | Plano | | 0.210 | Glass | 1.517 | 64.2 | — |
| 18 | | Plano | | 0.039 | | | | |
| 19 | Image | Plano | | — | | | | |

Note:
Reference wavelength is 587.6 nm (d-line).
An effective radius of the stop 901 (Surface 8) is 1.140 mm.

TABLE 18

Aspheric Coefficients

| Surface # | 2 | 3 | 4 | 5 | 6 |
|---|---|---|---|---|---|
| k = | 1.9413E−01 | −9.0000E+01 | −1.6843E+01 | −1.6404E+01 | −6.0311E+01 |
| A4 = | −3.7071E−03 | −9.1371E−02 | −1.3177E−01 | −2.2219E−02 | −2.1114E−01 |
| A6 = | −5.6023E−03 | 2.0326E−01 | 2.6189E−01 | −1.6096E−02 | 2.0165E−01 |
| A8 = | 1.7777E−02 | −1.8778E−01 | −2.0206E−01 | 1.4216E−01 | −2.7180E−01 |
| A10 = | −2.2747E−02 | 1.0029E−01 | 9.1451E−02 | −1.9010E−01 | 2.4246E−01 |
| A12 = | 1.4988E−02 | −1.5694E−02 | −3.3694E−03 | 1.0193E−01 | −1.2437E−01 |
| A14 = | −3.2518E−03 | −4.1048E−03 | −1.2596E−02 | −1.0914E−02 | 2.4959E−02 |
| A16 = | 1.0572E−04 | 9.8270E−04 | 3.4297E−03 | −6.5893E−03 | — |

| Surface # | 7 | 9 | 10 | 11 | 12 |
|---|---|---|---|---|---|
| k = | −4.5124E+01 | −7.6239E+01 | −5.1488E+01 | 7.7515E+00 | −1.1097E+00 |
| A4 = | −9.3690E−02 | −1.7507E−02 | −1.0887E−01 | −2.1897E−01 | −1.0304E−01 |
| A6 = | 9.7589E−02 | 6.0958E−02 | 7.0602E−02 | 1.7583E−01 | 7.6701E−02 |
| A8 = | −7.9728E−02 | −6.0909E−02 | −7.2039E−02 | −7.5052E−02 | −2.9043E−02 |
| A10 = | 3.1541E−02 | 1.8282E−02 | 5.5831E−02 | 2.3325E−02 | 1.7433E−02 |
| A12 = | −3.8298E−03 | −1.7251E−05 | −2.7971E−02 | −2.7167E−03 | −5.8105E−03 |
| A14 = | — | — | 6.3570E−03 | −1.8017E−04 | 7.3408E−04 |
| A16 = | — | — | — | — | −2.6848E−05 |

| Surface # | 13 | 14 | 15 | 16 |
|---|---|---|---|---|
| k = | −9.0000E+01 | 8.9996E+01 | −2.2876E+01 | −5.0223E+00 |
| A4 = | 1.0481E−01 | 2.0198E+00 | −2.1349E−01 | −1.0883E−01 |
| A6 = | −1.2379E−01 | −1.1526E+01 | 1.0903E−01 | 5.4189E−02 |
| A8 = | 6.7914E−02 | 2.8434E+01 | −5.3726E−02 | −1.9203E−02 |
| A10 = | −2.4324E−02 | −4.6700E+01 | 1.7256E−02 | 4.1417E−03 |
| A12 = | 4.9299E−03 | 4.7160E+01 | −2.9915E−03 | −5.0943E−04 |
| A14 = | −4.6089E−04 | −2.6329E+01 | 2.6100E−04 | 3.2768E−05 |
| A16 = | — | 6.2192E+00 | −9.0824E−06 | −8.5422E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.85 | (R3 + R4)/(R3 − R4) | −19.59 |
| Fno | 1.45 | (R8 + R9)/(R8 − R9) | 10.98 |
| HFOV [deg.] | 41.6 | (R13 + R14)/(R13 − R14) | 2.31 |
| V5 | 37.4 | |f/R11| + |f/R12| | 0.00 |
| |V1 − V4| | 0.1 | f/EPD | 1.45 |
| V3 + V5 + V6 | 78.2 | f/f1 | 0.57 |
| Vmin | 20.4 | |f7/f1| | 0.54 |
| T34/T56 | 0.80 | |f2/f6| | 0.00 |
| ATmax/ATmin | 14.80 | (TL)$^2$/(EPD × ImgH) | 2.95 |
| TL/T67 | 8.87 | BL/EPD | 0.28 |
| TL/EPD | 1.98 | TL/ImgH | 1.49 |
| |TL/f6| | 0.00 | |Dsr5/Dsr6| | 0.78 |

10th Embodiment

Figure 19:
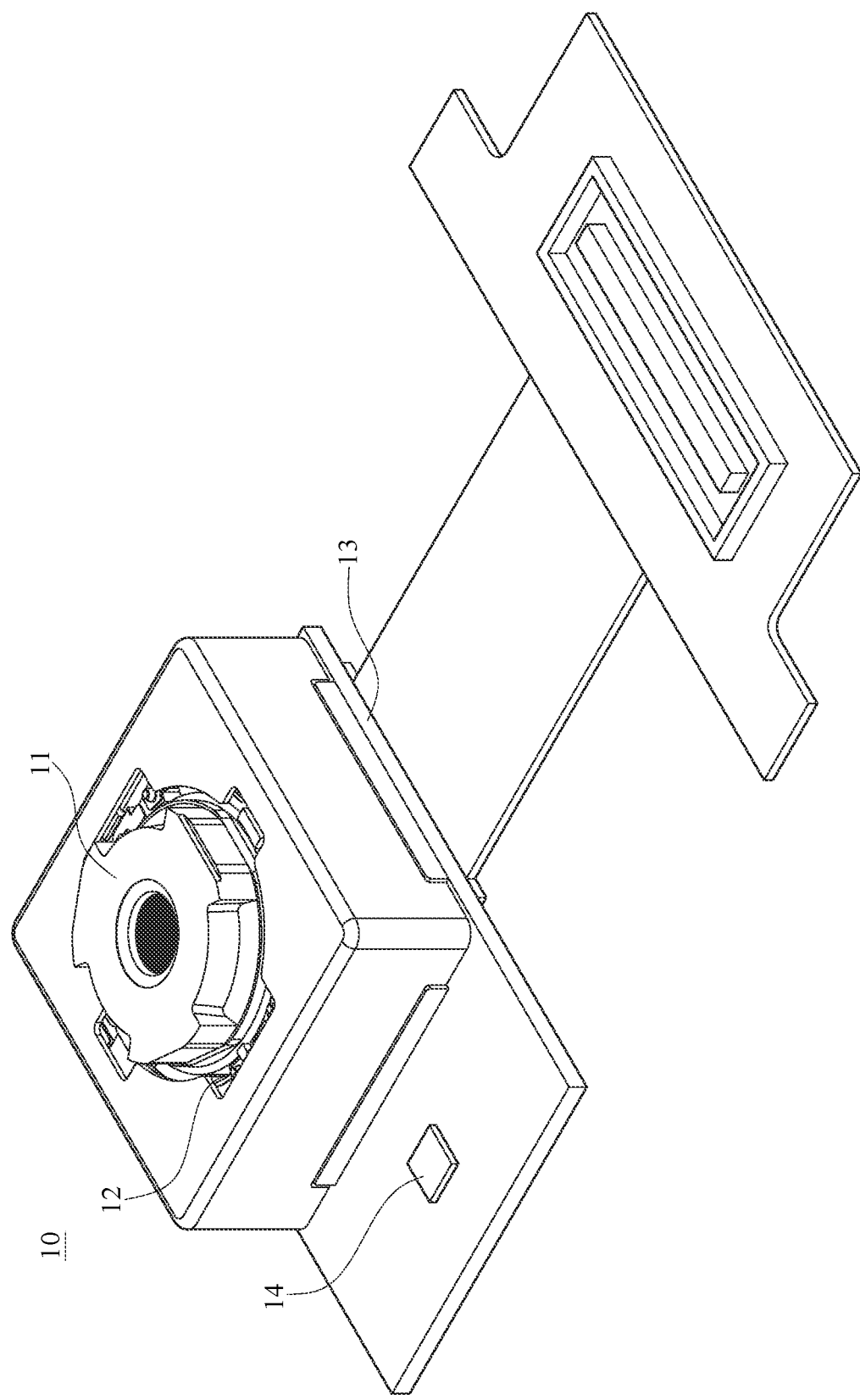
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The external light converges into the lens unit 11 of the image capturing unit 10 to generate an image, and the lens unit 11 along with the driving device 12 is utilized for image focusing on the image sensor 13, and the image is able to be digitally transmitted to an electronic component.

The driving device 12 can have auto focusing functionality, and different driving configurations can be through the use of voice coil motors (VCM), micro electro-mechanical systems (MEMS), piezoelectric systems, or shape memory alloy materials. The driving device 12 is favorable for the lens unit 11 to obtain a better imaging position, so that a clear image of the imaged object can be captured by the lens unit 11 with different object distances. The image sensor 13 (for example, CCD or CMOS), which can be featured with high photosensitivity and low noise, is disposed on the image surface of the photographing lens assembly to provide higher image quality.

The image stabilizer 14, such as an accelerometer, a gyroscope and a Hall effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

11th Embodiment

Figure 20:
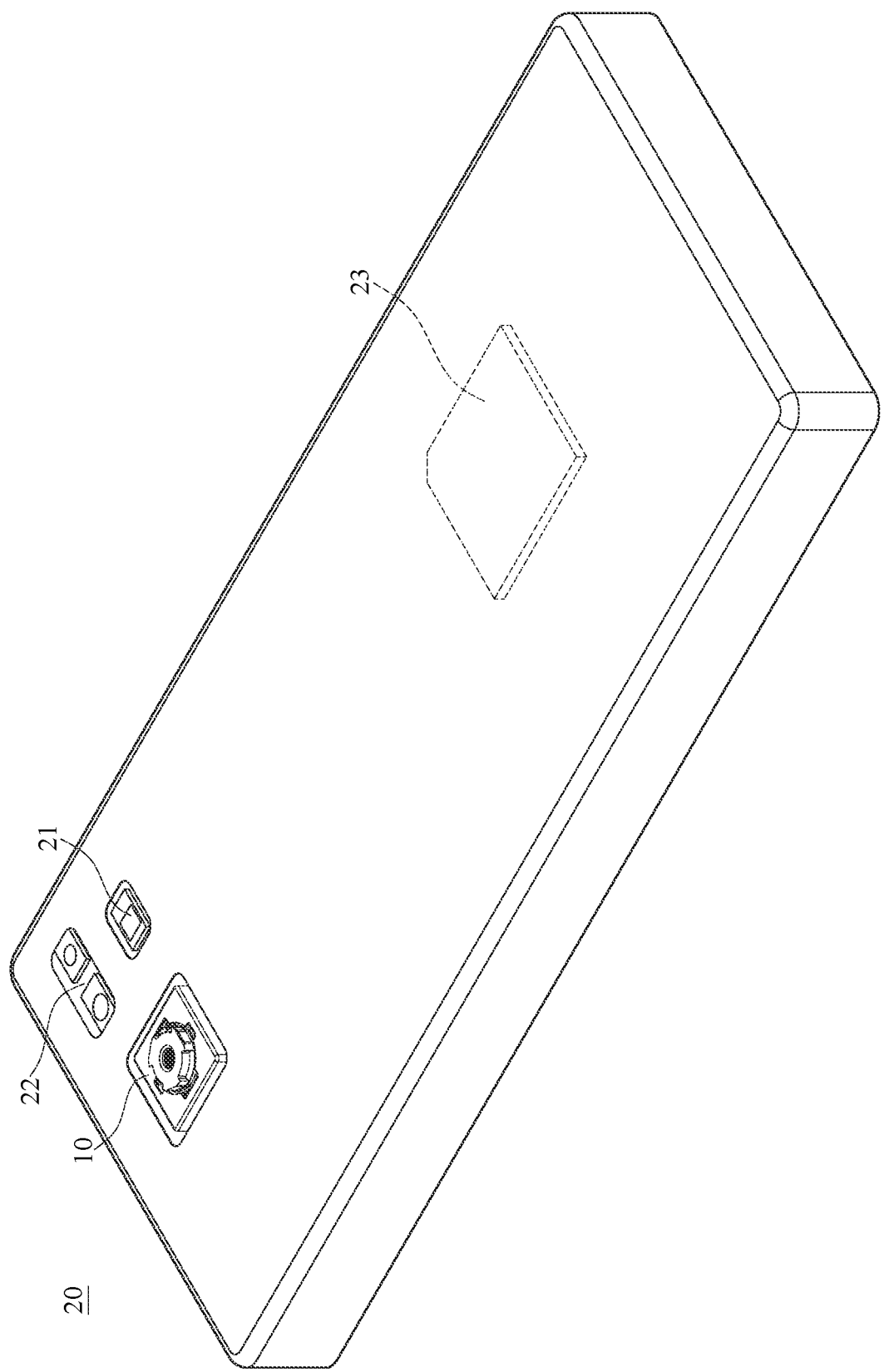
FIG. 20 is one perspective view of an electronic device according to the 11th embodiment of the present disclosure.
Figure 21:
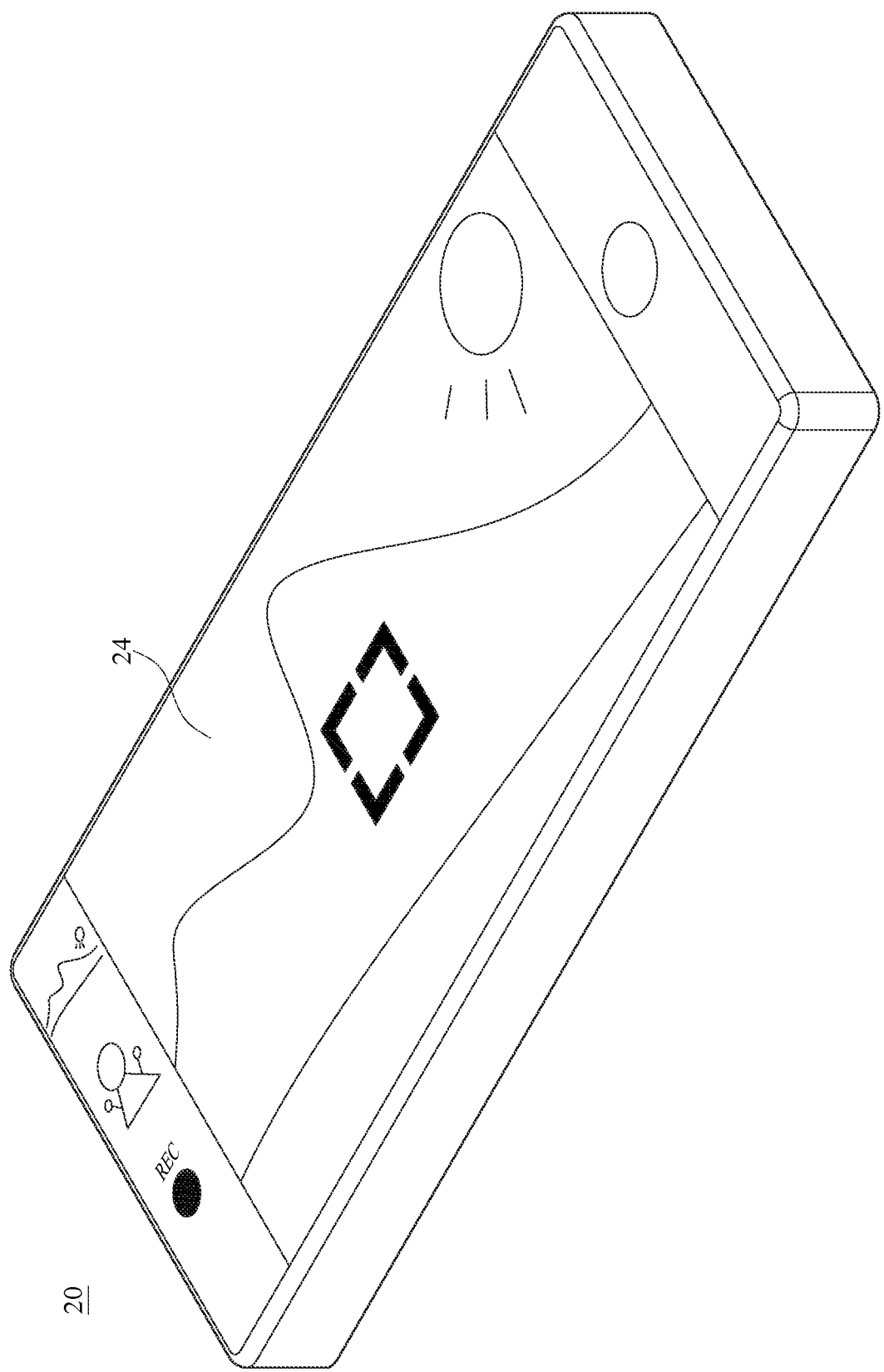
FIG. 21 is another perspective view of the electronic device in FIG. 20.
Figure 22:
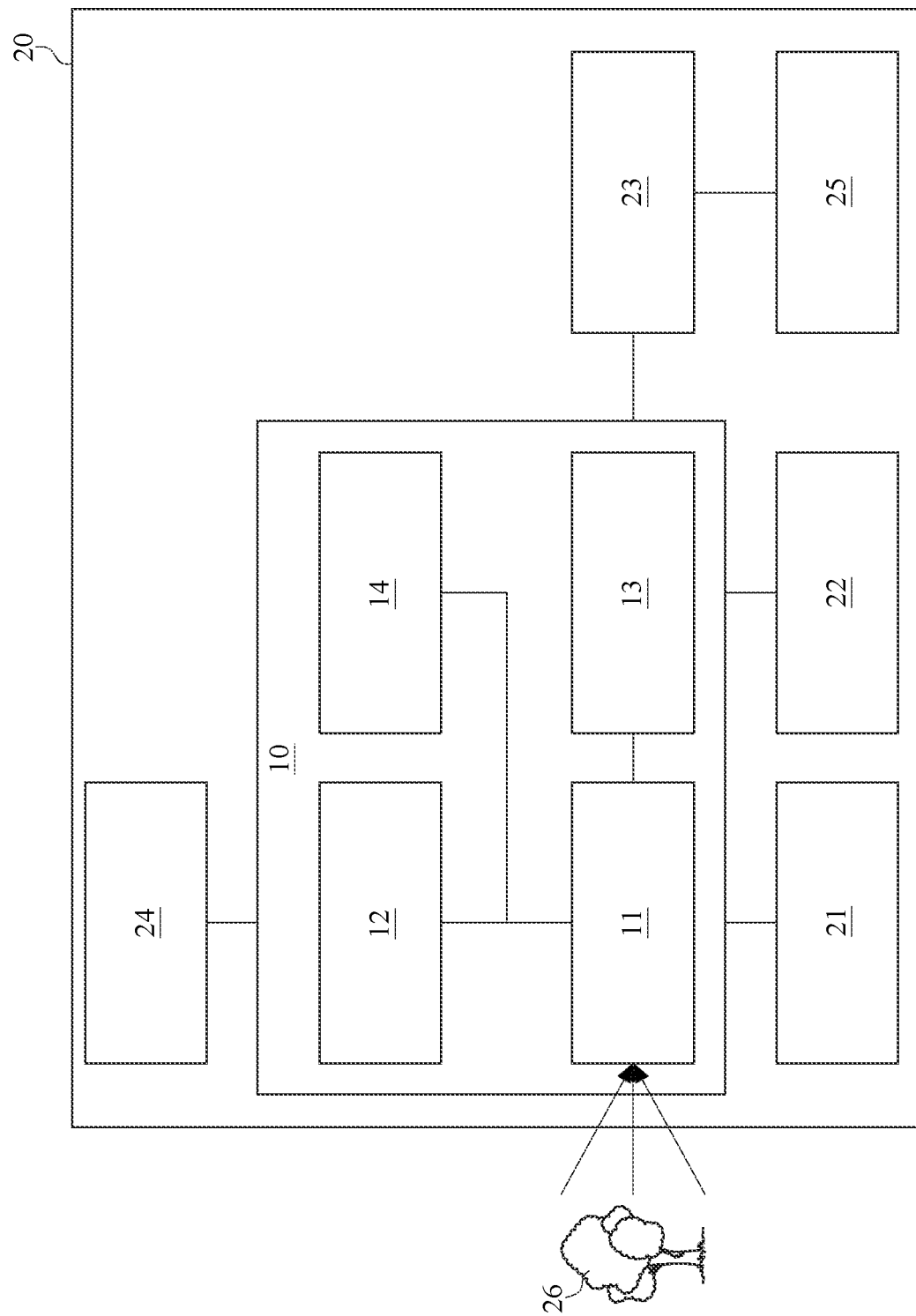
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20. In this embodiment, an electronic device 20 is a smart phone including the image capturing unit 10 disclosed in the 10th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 can include the image capturing unit 10 and other image capturing unit.

When a user captures the images of an object 26 through the user interface 24, the light rays converge in the image capturing unit 10 to generate images, and the flash module 21 is activated for light supplement. The focus assist module 22 detects the object distance of the imaged object 26 to achieve quick focusing. The image signal processor 23 is configured to optimize the captured image to improve the image quality. The light beam emitted from the focus assist module 22 can be either infrared or laser. The user interface 24 can be a touch screen or a physical button. The user is able to interact with the user interface 24 and the image software processor 25 having multiple functions to capture images and complete image processing.

The smart phone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 is featured with good capability in aberration corrections and high image quality, and can be applied to 3D (three-dimensional) image capturing applications, in products such as digital cameras, mobile devices, digital tablets, multiple camera devices, wearable devices, smart televisions, network surveillance devices, image recognition systems, motion sensing input devices, dashboard cameras, vehicle backup cameras and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the object-side surface of the first lens element is concave in a paraxial region thereof and has at least one convex shape in an off-axis region thereof, the image-side surface of the third lens element is convex in a paraxial region thereof, the object-side surface of the seventh lens element is convex in a paraxial region thereof, and the image-side surface of the seventh lens element is concave in a paraxial region thereof and has at least one convex shape in an off-axis region thereof;
wherein a minimum value among Abbe numbers of the seven lens elements of the photographing lens assembly is Vmin, and the following condition is satisfied:

$V\text{min} < 21.5.$

2. The photographing lens assembly of claim 1, wherein the second lens element has positive refractive power, and the fifth lens element has positive refractive power.

3. The photographing lens assembly of claim 1, wherein the image-side surface of the first lens element is convex in a paraxial region thereof.

4. The photographing lens assembly of claim 1, wherein the object-side surface of the second lens element is convex in a paraxial region thereof, and the image-side surface of the second lens element is concave in a paraxial region thereof.

5. The photographing lens assembly of claim 1, wherein the minimum value among Abbe numbers of the seven lens elements of the photographing lens assembly is Vmin, and the following condition is satisfied:

$V\text{min} \leq 19.3.$

6. The photographing lens assembly of claim 1, wherein an axial distance between the object-side surface of the first lens element and an image surface is TL, a maximum image height of the photographing lens assembly is ImgH, a focal length of the photographing lens assembly is f, an entrance pupil diameter of the photographing lens assembly is EPD, and the following conditions are satisfied:

$1.0 < TL/ImgH < 1.80;$ and $0.80 < f/EPD < 2.0.$

7. The photographing lens assembly of claim 1, further comprising an aperture stop disposed on an image side of the second lens element, wherein a curvature radius of the object-side surface of the fourth lens element and a curvature radius of the image-side surface of the fourth lens element have a same sign.

8. An image capturing unit comprising:
the photographing lens assembly of claim 1; and
an image sensor disposed on an image surface of the photographing lens assembly.

9. An electronic device comprising:
the image capturing unit of claim 8.

10. A photographing lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the object-side surface of the first lens element is concave in a paraxial region thereof and has at least one convex shape in an off-axis region thereof, the image-side surface of the third lens element is convex in a paraxial region thereof, the image-side surface of the sixth lens element is concave in a paraxial region thereof, and the image-side surface of the seventh lens element is concave in a paraxial region thereof and has at least one convex shape in an off-axis region thereof;
wherein a minimum value among Abbe numbers of the seven lens elements of the photographing lens assembly is Vmin, and the following condition is satisfied:

$V\text{min} < 21.5.$

11. The photographing lens assembly of claim 10, wherein the third lens element has positive refractive power; wherein half of a maximum field of view of the photographing lens assembly is HFOV, and the following condition is satisfied:

38.0 degrees<HFOV<55.0 degrees.

12. The photographing lens assembly of claim 10, wherein the image-side surface of the sixth lens element has at least one inflection point;
wherein a focal length of the second lens element is f2, a focal length of the sixth lens element is f6, and the following condition is satisfied:

|f2/f6|<3.20.

13. The photographing lens assembly of claim 10, wherein each of the seven lens elements is a single and non-cemented lens element;
wherein a focal length of the photographing lens assembly is f, a focal length of the first lens element is f1, and the following condition is satisfied:

−0.50≤f/f1≤0.88.

14. A photographing lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the object-side surface of the first lens element is concave in a paraxial region thereof and has at least one convex shape in an off-axis region thereof, the fourth lens element has negative refractive power, the object-side surface of the seventh lens element is convex in a paraxial region thereof, and the image-side surface of the seventh lens element is concave in a paraxial region thereof and has at least one convex shape in an off-axis region thereof;
wherein a minimum value among Abbe numbers of the seven lens elements of the photographing lens assembly is Vmin, and the following condition is satisfied:

Vmin<21.5.

15. The photographing lens assembly of claim 14, wherein the object-side surface of the third lens element is convex in a paraxial region thereof;
wherein a maximum value among axial distances between each of adjacent lens elements of the seven lens elements is ATmax, a minimum value among axial distances between each of adjacent lens elements of the seven lens elements is ATmin, and the following condition is satisfied:

5.0<ATmax/ATmin<19.0.

16. The photographing lens assembly of claim 14, wherein the minimum value among Abbe numbers of the seven lens elements of the photographing lens assembly is Vmin, a curvature radius of the object-side surface of the second lens element is R3, a curvature radius of the image-side surface of the second lens element is R4, and the following conditions are satisfied:

Vmin≤19.3; and

−20.0<(R3+R4)/(R3−R4)<1.0.

17. The photographing lens assembly of claim 14, wherein a focal length of the photographing lens assembly is f, an entrance pupil diameter of the photographing lens assembly is EPD, a curvature radius of the image-side surface of the fourth lens element is R8, a curvature radius of the object-side surface of the fifth lens element is R9, and the following conditions are satisfied:

0.80<f/EPD<2.0; and (R8+R9)/(R8−R9)<7.50.

18. A photographing lens assembly comprising seven lens elements, the seven lens elements being, in order from an object side to an image side, a first lens element, a second lens element, a third lens element, a fourth lens element, a fifth lens element, a sixth lens element and a seventh lens element; each of the seven lens elements having an object-side surface facing toward the object side and an image-side surface facing toward the image side;
wherein the first lens element has negative refractive power, the object-side surface of the first lens element is concave in a paraxial region thereof and has at least one convex shape in an off-axis region thereof, the fourth lens element has negative refractive power, and the image-side surface of the seventh lens element is concave in a paraxial region thereof and has at least one convex shape in an off-axis region thereof;
wherein a minimum value among Abbe numbers of the seven lens elements of the photographing lens assembly is Vmin, and the following condition is satisfied:

Vmin<21.5.

19. The photographing lens assembly of claim 18, wherein the second lens element has positive refractive power;
wherein a focal length of the first lens element is f1, a focal length of the seventh lens element is f7, and the following condition is satisfied:

|f7/f1|<4.0.

20. The photographing lens assembly of claim 18, wherein the third lens element has positive refractive power;
wherein an axial distance between the object-side surface of the first lens element and an image surface is TL, a focal length of the sixth lens element is f6, and the following condition is satisfied:

|TL/f6|<0.65.

21. The photographing lens assembly of claim 18, wherein an axial distance between the third lens element and the fourth lens element is T34, an axial distance between the fifth lens element and the sixth lens element is T56, a focal length of the photographing lens assembly is f, an entrance pupil diameter of the photographing lens assembly is EPD, and the following conditions are satisfied:

0<T34/T56<10.0; and 0.80<f/EPD<2.0.

22. The photographing lens assembly of claim 18, wherein a curvature radius of the object-side surface of the fifth lens element and a curvature radius of the image-side surface of the fifth lens element have a same sign.

* * * * *